United States Patent
Sato et al.

[11] 3,889,567
[45] June 17, 1975

[54] HORIZONTAL BAND SAW MACHINE

[75] Inventors: Masso Sato, Sagamihara; Tsuneo Aizawa, Isehara; Kenji Ohnishi, Sagamihara; Shigeo Koizumi, Hatano; Akio Fukuda, Yokohama; Shinki Kikuchi, Sagamihara; Shichiro Kusanagi, Isehara, all of Japan

[73] Assignee: Amada Company Limited, Isehara, Japan

[22] Filed: June 11, 1973

[21] Appl. No.: 368,993

Related U.S. Application Data

[62] Division of Ser. No. 159,625, July 6, 1971, Pat. No. 3,754,490.

[52] U.S. Cl. .............................................. 83/818
[51] Int. Cl. ..................... B23d 53/00; B23d 55/04
[58] Field of Search ............. 83/800, 816, 817, 818, 83/819

[56] References Cited
UNITED STATES PATENTS

| | | | |
|---|---|---|---|
| 2,602,987 | 7/1952 | Wells | 83/800 X |
| 2,884,026 | 4/1959 | Krenzke | 83/818 |
| 2,898,669 | 8/1959 | Crane et al. | 83/800 |
| 3,575,074 | 4/1971 | Aizawa | 83/800 X |

Primary Examiner—J. M. Meister

[57] ABSTRACT

The basic technical concept of the invention resides in a horizontal type band saw machine adapted to utilize the method of maintaining the band saw blade at a travelling speed selected depending upon the property and shape of the material to be machined, of introducing operating fluid or an hydraulic mechanism controlling raising and lowering of a housing accommodating said band saw blade into a plunger pump at a speed in accordance with an effective weight of the housing, and of sending out the thus introduced operating fluid by driving the plunger pump periodically in a cycle corresponding to the travelling speed of the band saw blade. The machine of the invention comprises novel mechanisms such as a mechanism for imparting a predetermined tension to the band saw blade, a safety mechanism for detecting slippage of the band saw blade, a guide mechanism comprising a combination of specially arranged roller-shaped guide member and plate-like guide member, a mechanism comprising a plurality of supporting means for supporting the back of the band saw blade, a mechanism for detecting conditions of the feeding material, a feed roller mechanism, and a mechanism for securely clamping sawn pieces.

1 Claim, 38 Drawing Figures

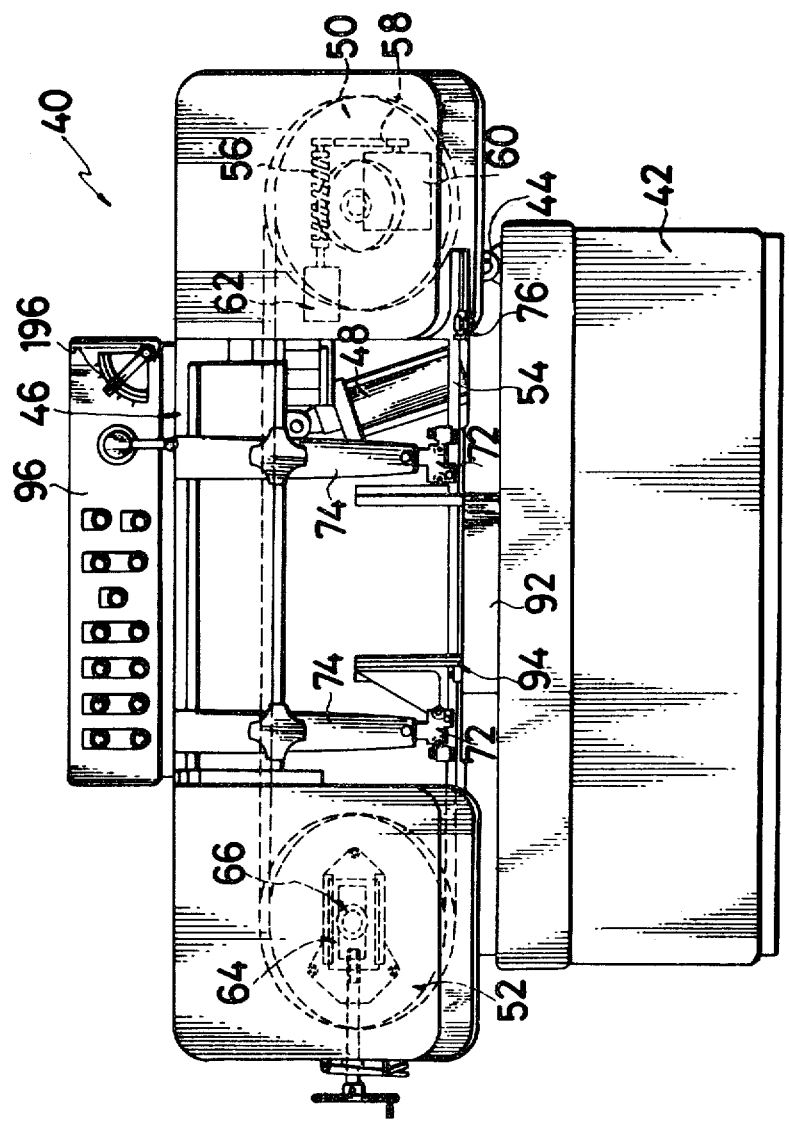

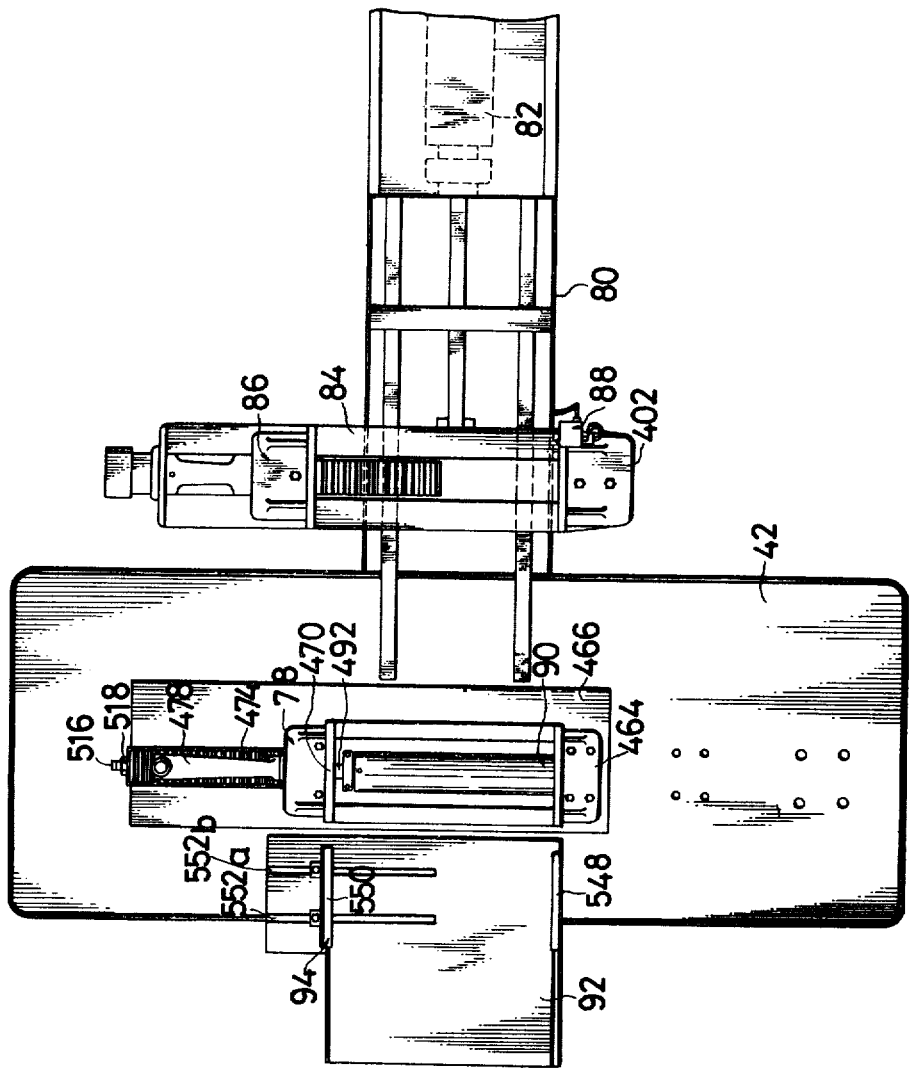

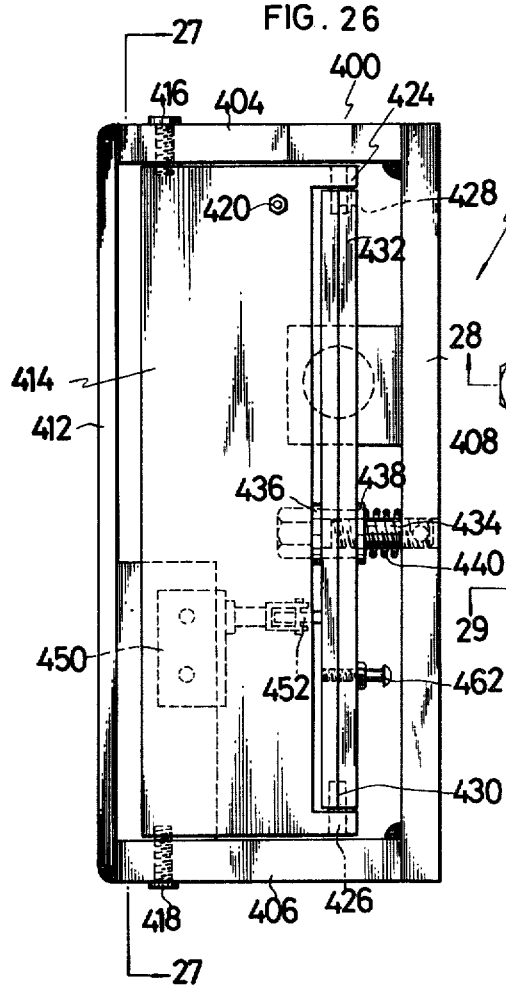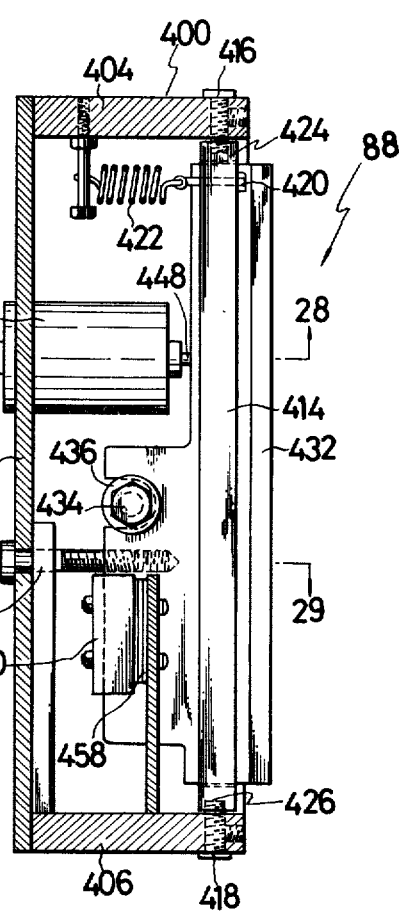

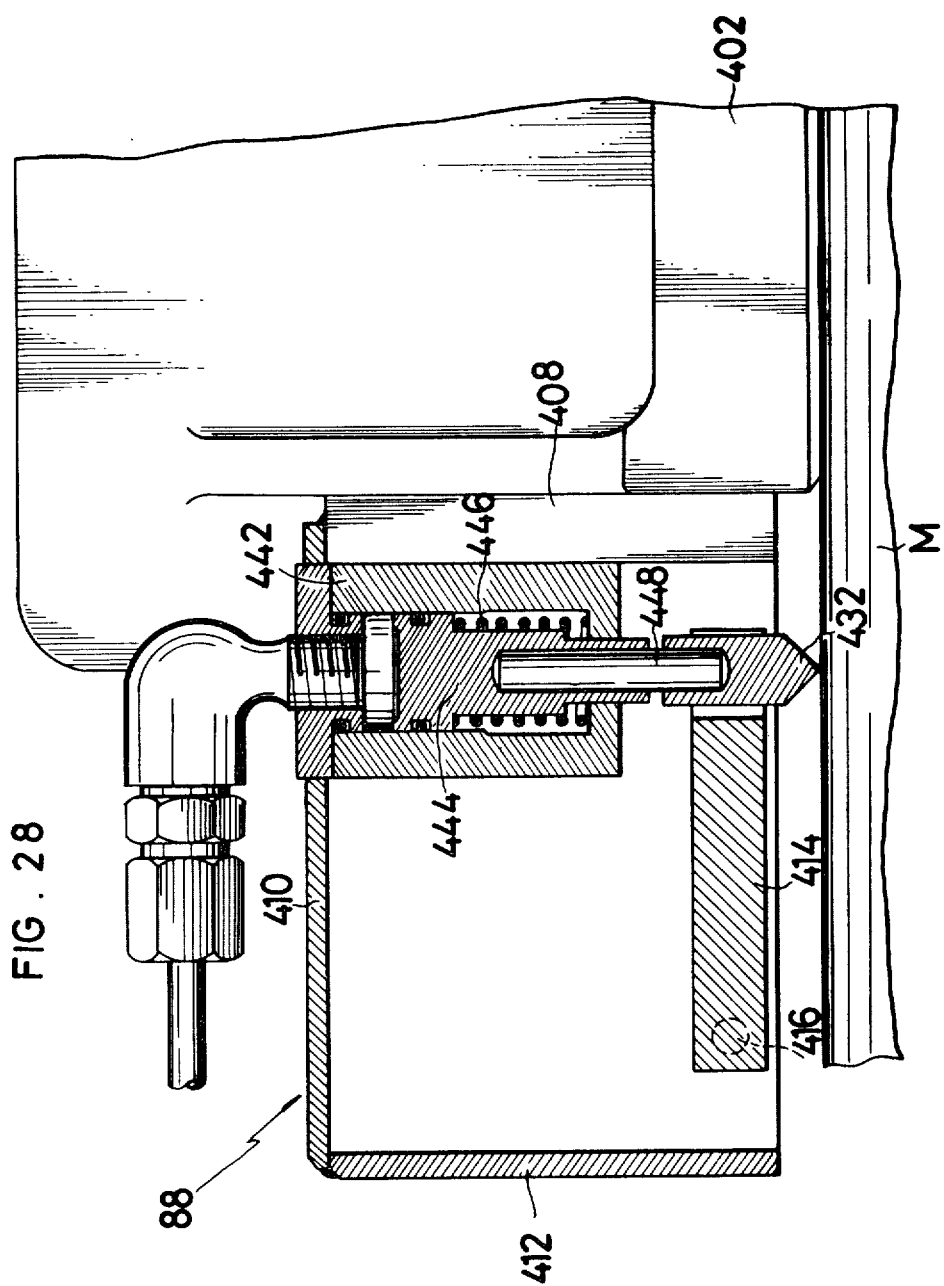

3,889,567

HORIZONTAL BAND SAW MACHINE

This is a divisional of application Ser. No. 159,625 filed July 6, 1971, titled "Horizontal Band Saw Machine", now U.S. Pat. 3,754,490.

DESCRIPTION OF INVENTION

This invention relates in general to a tool machine for metal materials and more particularly to a band saw machine wherein a band saw blade is passed with a predetermined tension around a driving wheel and at least a driven or follower wheel, said driving wheel being accommodated within a housing which is movable up and down with respect to a stationary or fixed basic structure of the machine hydraulically or by any other suitable means, said band saw blade being cyclically put in travel for carrying out the cutting operation.

In the conventional machine of the type mentioned above, it has been found that, when cutting such workpiece as of metallic material, the durability of the band saw blade as well as the efficiency of the cutting operation is greatly affected by the shape and dimention of the cutting material and the manner for adjusting the lowering speed or the band saw blade during cutting operation.

It is the generally accepted method to control the lowering speed of the housing or of the band saw blade through a hydraulic mechanism wherein, in order to lower the housing, downward pressure is imparted to a piston or a hydraulic cylinder adapted for lifting and lowering the housing by the whole weight of the body of the housing and the operating fluid under this pressure is passed through a flow rate adjusting valve which permits the operating fluid to pass therethrough at a predetermined rate to obtain a desired lowering speed of the housing. When a round rod is used as a workpiece in the cutting operation as shown in FIG. 3, however, the reacting force (attaching resistance) exerted to the saw blade by the workpiece changes with variations in the length of the band saw contacting with the workpiece, causing correspondingly variations in the effective weight pressurizing said piston, with the result that the lowering speed of the housing becomes lower than the band saw is attacking the center portion of the round rod and, on the other hand, the speed becomes higher at the top and bottom ends of said rod.

In view of the difficulty mentioned above, there has been proposed to control the flow rate of the operating fluid by means of a flow rate adjusting valve once the cutting operation is commenced. However, the opening area of the flow rate adjustment valve is determined solely by experience taking into consideration such factors as maximum cutting length (maximum length of the band saw with which it contacts with the workpiece) and the travelling speed of the band saw speed. Thus, if the cutting operation is started with too wide an opening of the flow rate adjustment valve, the attacking force of the band saw becomes too large at the top of the round rod and causes the saw teeth to be chipped off. On the other hand, if the travelling speed of the band saw is too low, the saw tends to warp. This warp curving of the band saw often results in erroneous curves in the finished line. If, on the contrary, the cutting operation is commenced with too small an opening of the flow rate adjustment valve, there would be no problem at the beginning of the cutting operation, however, the lowering speed would be decreased as the cutting length is increased, or the band saw would completely fail to be lowered.

Furthermore, with the machine of the type mentioned above, the cutting operation is carried out by a band saw blade tensioned around a driving and a driven wheel, the saw blade being moved in a circular path of travel by frictional contact with the driving wheel, so that the saw becomes elongated and loose during cutting operation with a corresponding lowering in the coefficient of friction. If the cutting resistance exceeds the frictional force due to over-loading, the saw tends to slip or becomes slow in motion or dismounted from its position on the wheels. These necessitates frequent stops during cutting operation. In order to overcome this difficulty, it has heretofore been proposed either to keep the tension of the band saw blade to a suitable level throughout a cutting operation hydraulically or to restore tension of the band saw to a suitable level after completion of every one cycle of the cutting operation by means of a hydraulic pressure used for lifting the housing, thus maintaining the band saw at the restored tension throughout subsequent one cutting cycle. It is disadvantageous to maintain the tension of the saw blade by hydraulic pressure throughout whole cutting operation not only because it causes increase in the temperature of the working fluid and as a consequence shorten the service life of the fluid but because it causes various inconveniences and requires complicated mechanism since it utilizes the same source of fluid as that for controlling the lowering speed of the saw blade through control of the flow rate of the fluid stated hereinabove.

It has also been proposed for protective purposes to provide a mechanism for stopping the machine either when the saw blade is broken off or when the driving motor is overloaded. However, while such mechanism provides safety against accidents, it fails to control the feeding operation of the cutting material in relation to the saw blade, with the result that the life of the saw blade is unduly shortened due to repeated saw teeth sinking in the cutting material or due to damage to the saw teeth or saw breakage.

Further, in the band saw machine of the type mentioned above, the band saw is applied around a pair of slantingly disposed driving and driven wheels, so that it is required to provide means for orientating the saw blade perpendicular to the cutting material. In order to accomplish this, it has been proposed to provide a guide mechanism utilizing a roller-shaped or plate-like guide member. The roller member contacts the saw blade linearly so frictional frictinal wear is relatively small. However, the roller guide member lacks in the capability of absorbing vibrations of the band saw. On the other hand, the plate-like guide member is effective for absorbing the vibrations and maintaining the posture of the saw blade stably, however, it has a drawback in that it cannot be used in a high-speed band saw machine due to the largeness or frictional wear resulting from contact with the saw blade. Another drawback inherent to both of these guide members is that sawdust apt to stick to the saw body under the influence of the pressure exerted by these guide members and this might be a cause of saw breakage, it follows that the saw blade soon becomes useless even if its teeth are still sharp enough.

Furthermore, it is necessary to regulate the position of the band saw before and after the cutting portion of the workpiece by supporting the saw body on the right, left and back sides thereof with respect to the advancing direction of the workpiece. In order to accomplish this, it has been the conventional practice either to impart a predetermined attacking pressure to the band saw blade or to press the cutting material against the saw blade while moving the saw along a predetermined path of travel. In any case, the attacking pressure is imparted or bore by a supporting means adapted for supporting the back of the saw blade. Such means therefore is required to have resistance to a high contacting pressure for bearing the band saw blade moving at a high speed, and on the contrary function to protect the back of the band saw against damages. To comply with these requirements, there has been proposed a band saw back supporting mechanism employing a radial bearing for supporting the back of the saw blade or a thrust bearing adapted to support the back of the saw blade in a position off its center. The former is advantageous in that it may be invariably held in contacting relationship with the saw blade even if the blade is arcuately deformed when a large cutting resistance is applied thereto, but has a drawback that, due to linear contact with the saw blade, the attacking pressure is centralized on a small unit area of the roller so that the roller is grooved along the circumferencial surface contacting the saw blade or the saw blade shows a tendency of being thickened due to deformation in the back portion thereof. The latter or the roller guide member of the radial bearing is advantageous in that the load per unit area is relatively small since the contacting area is defined by the thickness of the saw blade as well as its arc length contacting the thrust surface. However, the bearing contacts the saw blade at a higher speed in the circumferencial portion thereof than in the center portion, so that the central portion becomes to stand out in relief due to abrasive wearing in the circumferencial portion, causing spontaneous bending to the saw blade as a result of failure of correct guidance.

Further, with the band saw machine of the type mentioned above, it has been necessary for the operator to go behind the machine and push the workpiece forward on the base by using a bar or similar tools upon completion of every one cycle of cutting operation.

It is therefore the primary object of the invention to provide a band saw machine which will eliminate the difficulties mentioned above, and wherein means are provided for controlling the lowering speed of the housing by driving a plunger pump in a cycle corresponding to the travelling speed or the band saw, not by means of a flow rate adjustment valve, and at the same time, by reciprocatingly moving a plunger of the plunger pump by pressure arising from the effective weight imparting pressure to a cylinder adapted for lifting and lowering the housing, thereby to control the outflow of the operating fluid for controlling the lowering speed of the housing, whereby the most efficient cutting operation may be achieved even by inexperienced operators only by selecting a band saw of a shape and with a number of teeth specified for a particular cutting material to be sawn, determining cutting conditions in accordance with the band saw speed, and by setting a dial in a specified position in accordance with the size and shape of the workpiece.

A further object of the invention is to provide a machine of the type mentioned above, wherein a predetermined tension may be imparted to the band saw effectively and economically by a combination of a stored force of a spring, lever means, and a wedge member.

Another object of the invention is to provide a machine of the type mentioned above, wherein means are provided for detecting a slip between the saw blade and the saw wheel for stopping the driving of the band saw upon detection of the slip and at the same time for stopping the feeding of the workpiece toward the saw blade to protect the saw blade.

A still further object of the invention is to provide a machine of the type mentioned above, wherein there is provided a band saw blade guide mechanism comprising a combination of a roller-like guide member and a plate-like guide member, whereby vibrations or the saw blade may be completely absorbed and resistance to frictional where may be suitably retained.

Still another object of the invention is to provide a machine of the type mentioned above, wherein the roller-like guide member of said band saw blade guide mechanism is divided into upper half and lower half sections to impart twisting to the saw only from one side in these sections without using the conventional unified guide system adapted to guide the saw by applying pressure grippingly from both sides. With the guide mechanism of the invention the turning-up operation of the saw blade may be made easier and therefore the saw body is less susceptible to damages.

A further object of the invention is to provide a machine of the type mentioned above, wherein the plate-like guide member of said saw blade guide mechanism is specially arranged such that cutting oil may be fed to both sides of the bladed cutting portion of the saw efficiently and uniformly in a direction parallel to the travelling direction of the saw blade and at a flow speed higher than the travelling speed of the saw, thereby to lengthen service lift of the band saw and at the same time to minimize wear of the cutting oil.

Another object of the invention is to provide a machine of the type mentioned above, wherein there is provided a means for supporting the back of the band saw, said means having resistance to frictional wear which might result from contact with the band saw driven at a high speed, said means serving to protect the saw back against damages as well.

A still further object of the invention is to provide a machine of the type mentioned above, wherein a driving wire brush is provided beneath the band saw blade and forcibly rotated by a driving shaft in a direction perpendicular to the travelling direction of the saw blade, a pair of driven or follower wire brushes are disposed on opposite sides of the saw in a sandwitching relationship therewith and rotated in follow-up of the movement of the saw blade, and a cam mechanism is mounted on the driving wire brush for moving the driven wire brushes up and down arcuately for removing sawdust deposited on the saw blade completely, thereby to enhance accuracy of cutting operation and to lengthen the service life of the band saw.

Still another object of the invention is to provide a machine of the type mentioned above, wherein cutting failures due to incorrect dimentioning of the feeding material in a cutting machine especially of fully automated type may be prevented by providing a confirming means behind a feeding vice thereby not only to detect absence of the feeding material but to stop the operation by the feeding system giving at the same time a warning once a slippage occurs between the feeding material and the feeding vice.

A still further object of the invention is to provide a machine of the type mentioned above, wherein the workpiece feed roller can be raised above or sunk beneath the upper surface of the base of the machine by using the hydraulic pressure for operating the hydraulic vice adapted for fixing the workpiece, whereby for relieving the manual labor for feeding the workpiece and enabling an extremely simplified feeding operation.

A further object of the invention is to provide a machine of the type mentioned above, wherein there are provided a stationary fence and a movable fence on a sawn piece receiving table, said movable fence being moved in accordance with compiling width of the sawn pieces or machined products, so that sawn pieces may be held on the receiving table regularly and then received into a container.

Still another object of the invention is to provide a machine of the type mentioned above, wherein a slit is provided in either one of pivotal connections between a base structure of the machine and a housing, the gap space of the slit is clampingly adjusted so as to fit both structures adjustably to each other thereby to hole the housing stably in position with respect to the base structure, thereby to enhance accuracy of cutting operation.

These together with other objects, features and advantages of the invention will become apparent from the following specification and appended claims taken in conjunction with the accompanying drawings forming a part hereof and wherein:

FIG. 1 is a front elevation of the machine according to the invention;

FIG. 2 is a fragmentary plan view of the machine shown in FIG. 1, showing on enlarged scale the base structure with the housing and the housing elevating mechanism removed;

FIG. 26 is a side view on enlarged scale of the mechanism for detecting conditions of the cutting material forming one of the features of the machine according to the present invention;

FIG. 27 is a cross-sectional view taken along line 27 — 27 of FIG. 26;

Figure 17:
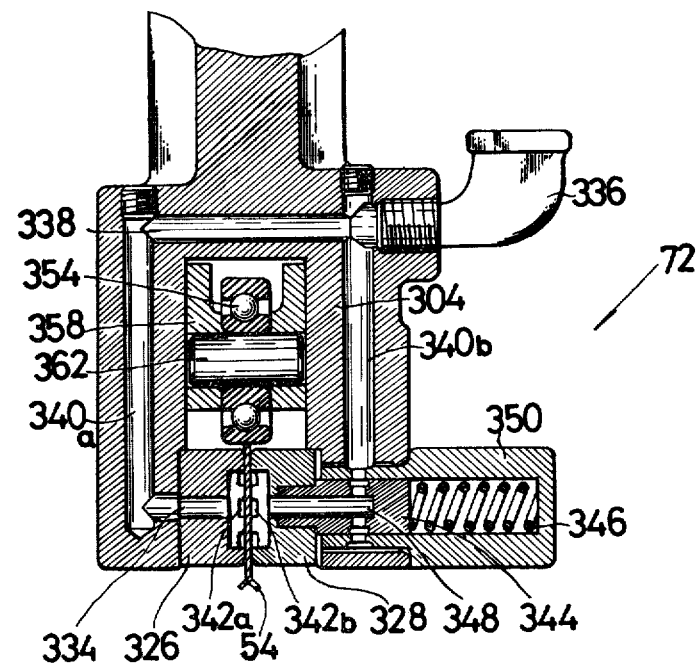
FIG. 17 is a cross-sectional view taken along line 17 — 17 of FIG. 15.
Figure 29:
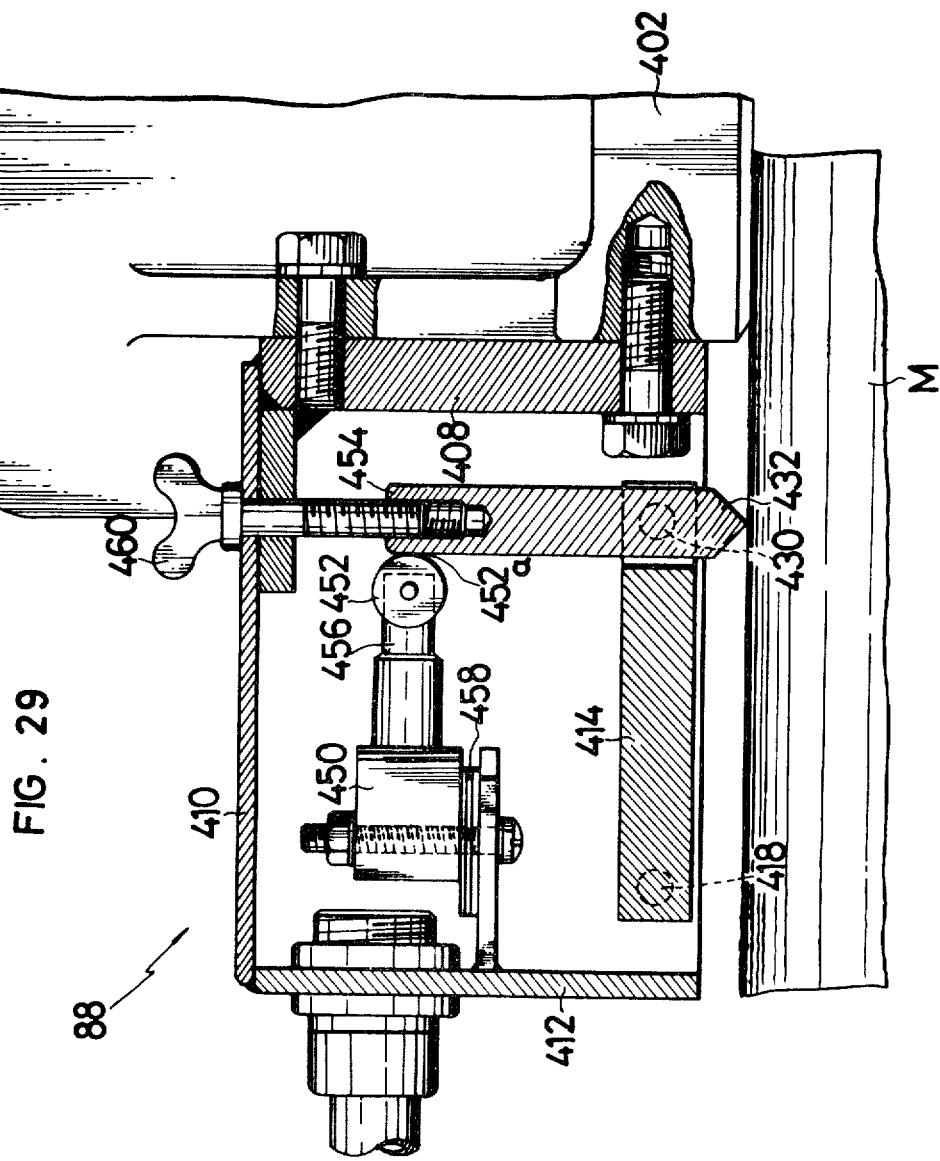
Figure 30:
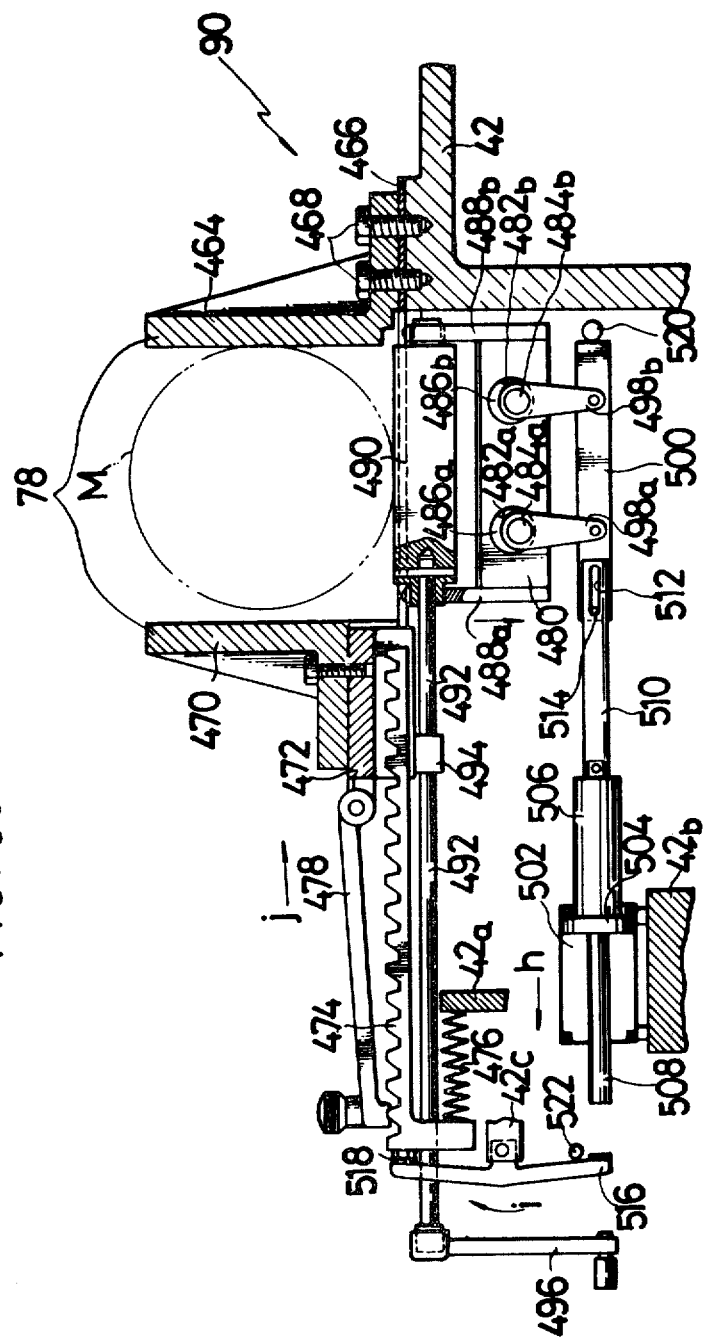
Figure 31:
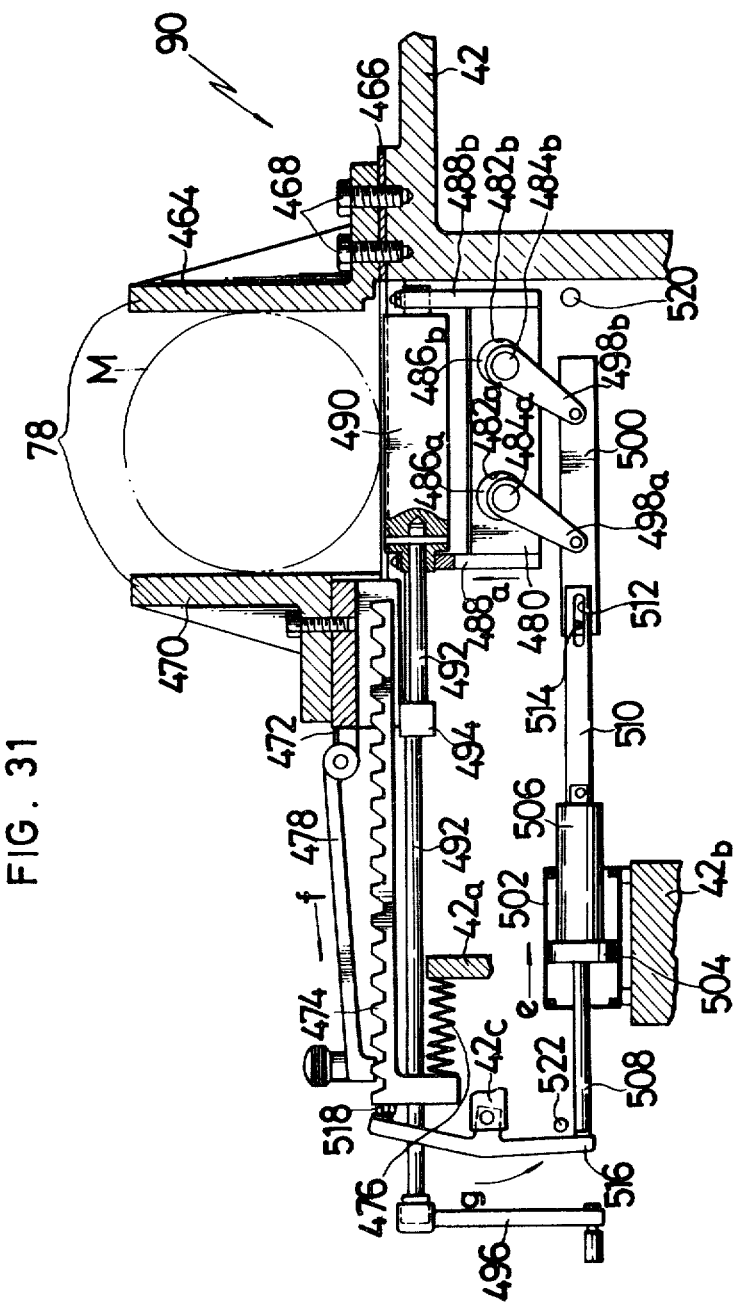
Figure 32:
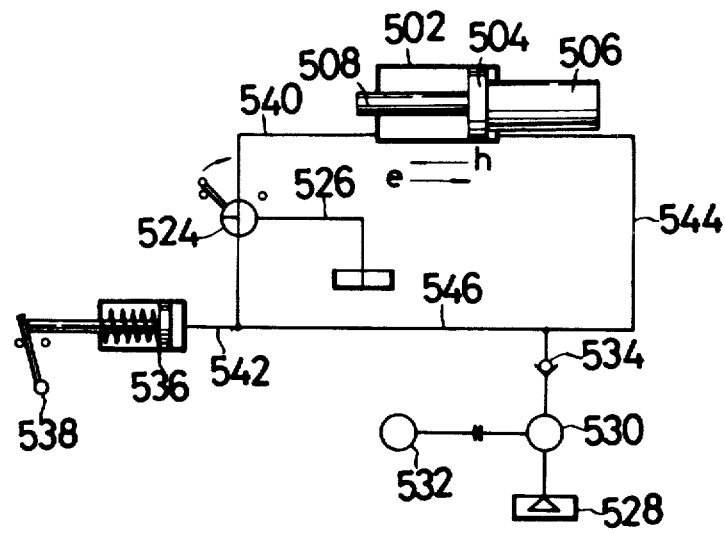
Figure 33:
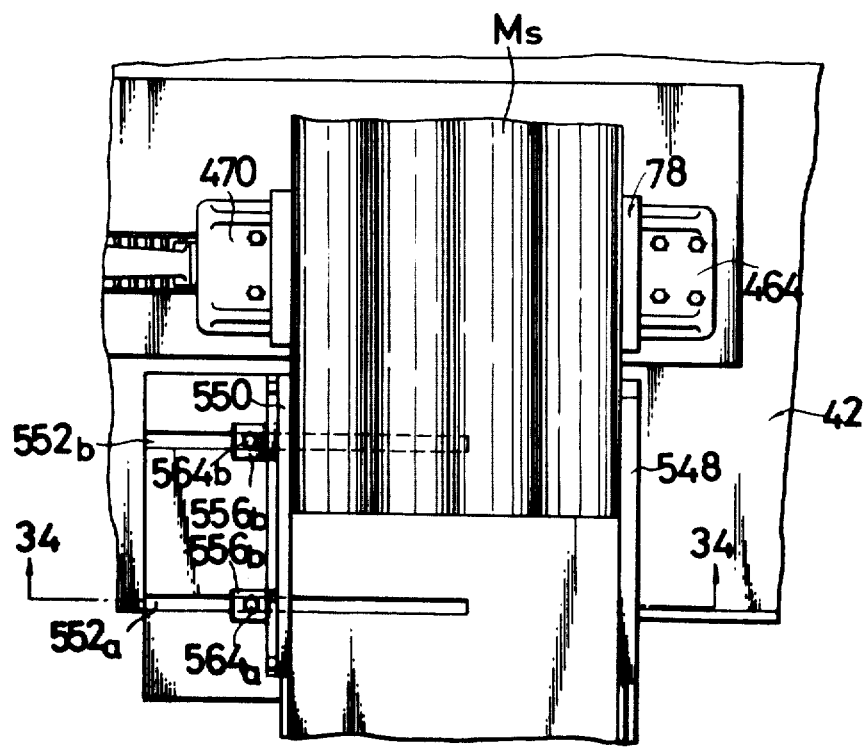
Figure 34:
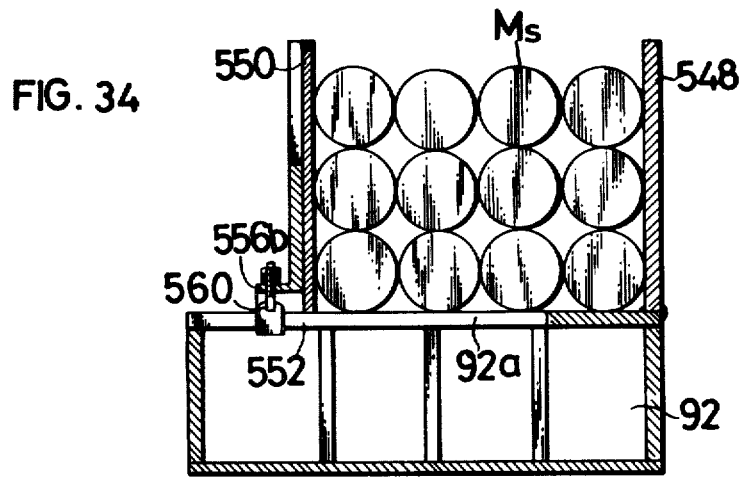
Figure 35:
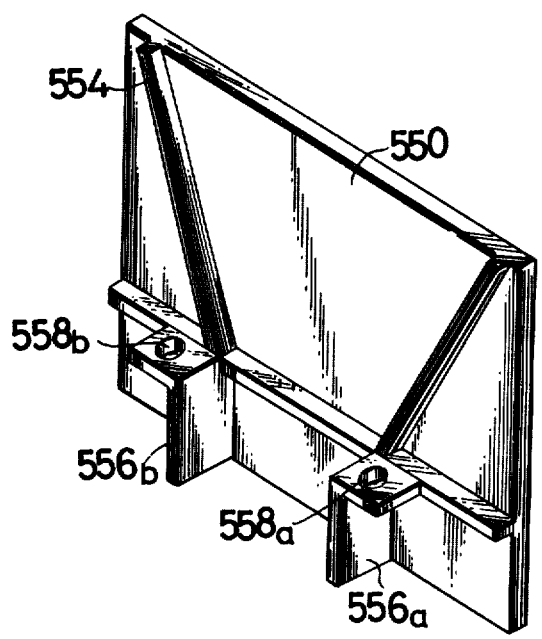
Figure 36:
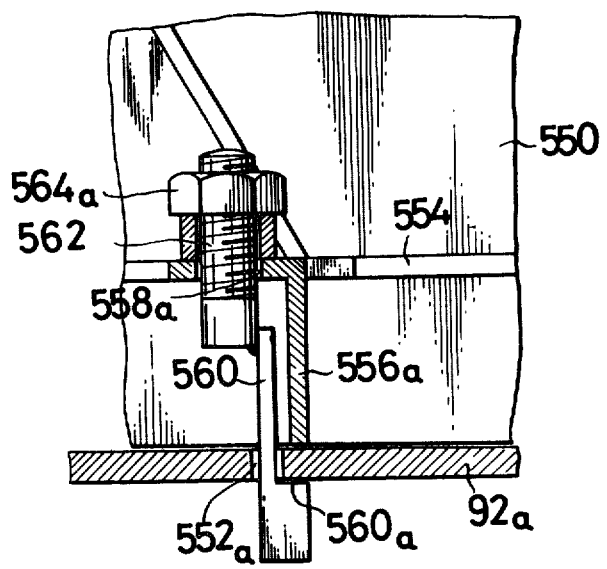
Figure 37:
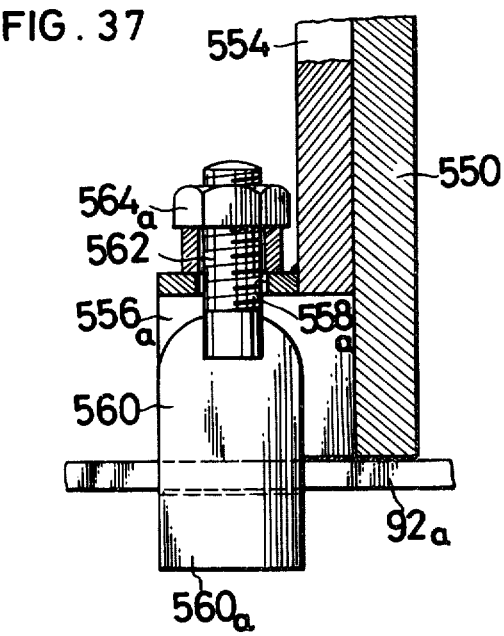
Figure 38:
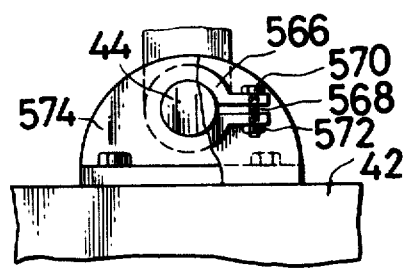

FIGS. 28 and 29 are cross-sectional views taken along lines 28 — 28 and 29 — 29 of FIG. 17, respectively;

FIG. 30 is an explanatory view of the feed roller mechanism forming one of the features of the machine according to the present invention, showing the roller mechanism as in feeding operation;

FIG. 31 is an explanatory view of the feed roller mechanism of FIG. 30 as in the position at the time of completion of feeding operation;

FIG. 32 is a view showing the hydraulic circuit for controlling the main vice mechanism and the feed roller mechanism interrelatedly;

FIG. 33 is a plan view of the clamping mechanism forming another one of the feature of the machine according to the invention, with portions thereof being removed for simplification of illustration;

FIG. 34 is a cross-sectional view taken along line 34 — 34 of FIG. 33;

FIG. 35 is a perspective view of the moving fence of the clamp mechanism shown in FIG. 33;

FIG. 36 is a sectional side view on enlarged scale of the hook attaching portion of the movable fence;

FIG. 37 is a cross-sectional view on enlarged scale of the hook attaching portion of the movable fence; and FIG. 38 is a plan view on enlarged scale of the hinged portion of the machine of the invention, with portions being removed for simplification of illustration.

Referring to the drawings, and first to FIG. 1, the band saw machine embodying the invention is generally indicated at 40 and comprises a housing 46 pivotally mounted on a base structure 42 by a hinge pin 44, the housing 46 being movable arcuately up and down about the hinge pin 44. Accommodated rotatably within the leftward and rightward end portions of the housing 46 are a driving wheel 50 and a driven or follower wheel 52 over which there is passed an endless band saw blade 54. The driving wheel 50 is rotated by a belt 58 which is driven from a motor 60 viz worm shaft 56. This worm shaft 56 has one end thereof connected to a plunger pump 62 of a housing lowering speed controlling mechanism. On the other hand, the driven wheel 52 is connected with a tensioning means 64 adapted for adjusting the tension of the band saw blade by moving the driving and driven wheels 50 and 52 toward or away from each other, and with a sensor means 66 which serves not only to electrically detect a slip between the driven wheel 52 and the band saw blade 54 but also to stop the cutting operation by the band saw 54 upon detection of such slip. Between the driving and driven wheels 50 and 52 and adjacent to the lower run of the band saw blade 54, there are provided two spaced guide mechanisms 72 each comprising a cutting oil feeding means 68 adapted to guide the band saw blade 54 perpendicular to the plane of the cutting material or workpiece while feeding cutting oil onto both sides of the blade, and a back supporting means 70, each of said guide mechanisms being attached to a lower portion of a bracket 74 pendent from the housing 46. Further, the band saw machine 40 includes a wire brush unit 76 located adjacent to the lower run of the band saw blade 54 and the driving wheel 50 thereby to remove saw dust deposited on the saw blade.

As shown in FIG. 2, the base structure 42 is provided with a hydraulically operating main vice unit 78 for clamping the cutting material. Extended rearwardly from the base structure 42 is a feeding table 80 having a feeding bed 84 which may be slide back and forth by a feeding cylinder 82. The feeding bed 84 has mounted thereon a hydraulic vice unit 86 associated with a detecting unit 88 adapted to detect feeding conditions of the cutting material. Immediately beneath the main vice unit 78 there is provided a feed roller unit 90 which may be protruded beyond the upper surface of the base structure 42 by means of the hydraulic system of the main vice unit 78 for facilitating the feeding operation. Extended forwardly from the base structure 42 is a reception table 92 which comprises a clamping unit 94 for securely holding the workpiece which has already been cut. A control box 96 is mounted on the housing 46 for controlling the operation by the above mentioned various moving units or parts.

Figure 4:
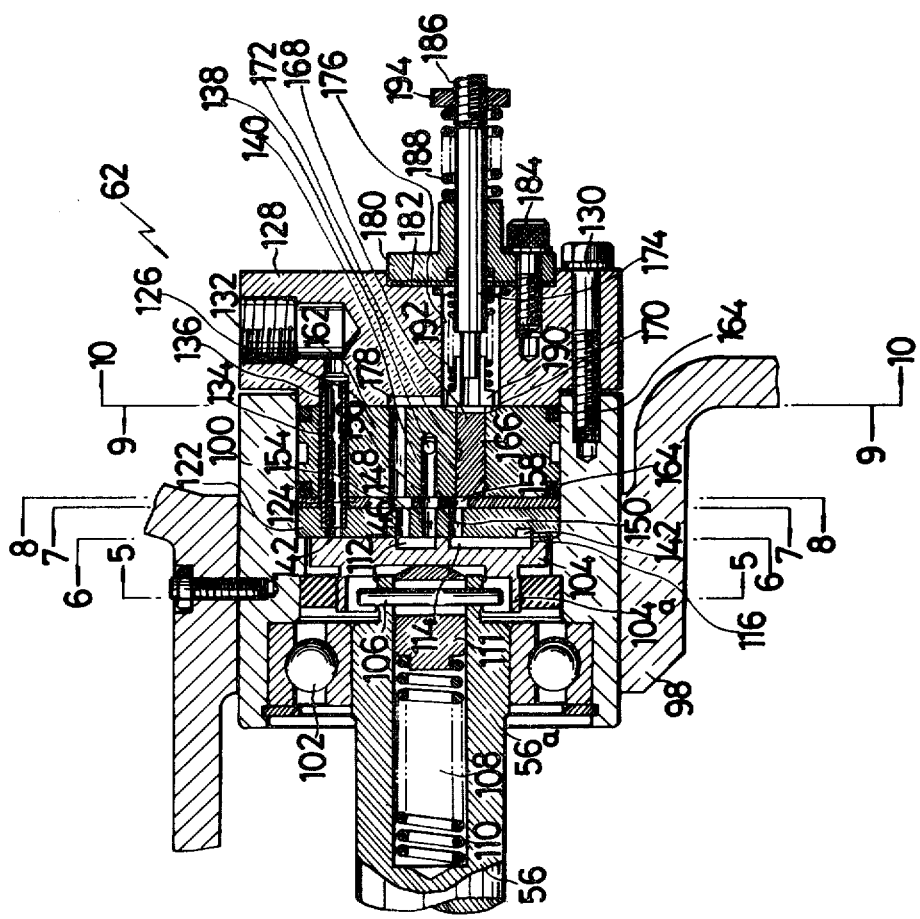
FIG. 4 is a fragmentary sectional view showing on enlarged scale the plunger pump of the lowering speed controlling mechanism of the machine according to the invention.
Figure 5:
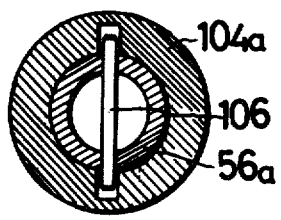
FIG. 5 is a cross-sectional view taken along line 5 — 5 of FIG. 4, showing linkage between the worm shaft and the distributor, with portions thereof removed for simplification of illustration.
Figure 6:
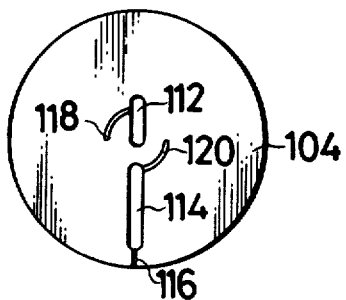
FIG. 6 is a cross-sectional view taken along line 6 — 6 of FIG. 5, showing one end face of the distributor with portions thereof removed for simplification of illustration.
Figure 7:
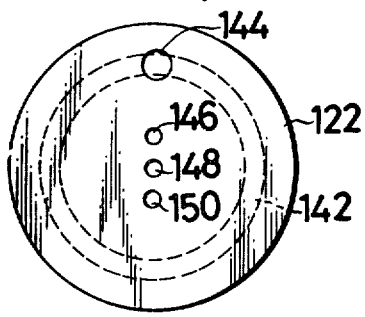
FIG. 7 is a cross-sectional view taken along line 7 — 7 of FIG. 4, showing one end face of the circular plate member with portions thereof removed for simplification of illustration.
Figure 8:
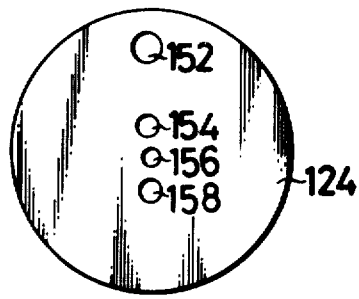
FIG. 8 is a cross-sectional view taken alone line 8 — 8 of FIG. 4, showing one end face of the sheet member with portions thereof removed for simplification of illustration.
Figure 9:
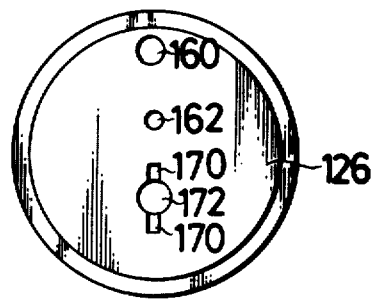
FIG. 9 is a cross-sectional view taken along line 9 — 9 of FIG. 4, showing one end face of the cylindrical member with portions thereof removed for simplification of illustration.
Figure 10:
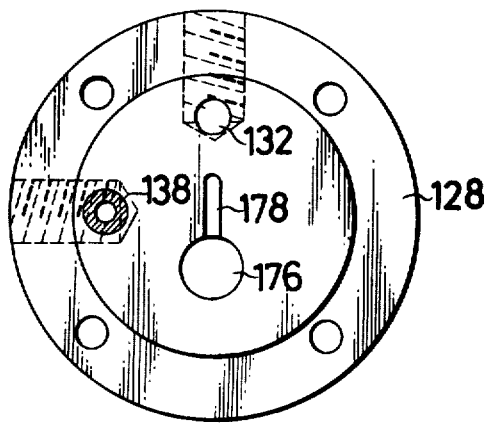
FIG. 10 is a cross-sectional view taken along line 10 — 10 of FIG. 4, showing one end face of the lid member with portions thereof removed for simplification of illustration.

Referring to the various parts of the machine, and first to the plunger pump 62 of the lowering speed controlling mechanism of the housing 46, the worm shaft 56 has one end thereof rotatably secured by a bearing 102 to a cylindrical member 100 fixed to a bracket 98 of the housing 46, as shown in FIG. 4. Within the cylinder member 100, there is provided a distributor in a form of stepped thick disc 104 wherein that section 104a of said circular distributor having a small rotatably fits over (see FIG. 5) a spring pin 106 piercing through the worm shaft 56 near its tip 56b, and at the same time, the same section of the distributor is pressed rightward by a boss 111 which is, in turn, permanently pressed by a spring 110 provided in a circular hole 108 located in the worm shaft 56. The face of the distributor 104 with a large diameter is provided with two separate grooves 112, 114 as shown in FIG. 6. The groove 112 extends axially outward from the center of the distributor. The groove 114 is provided in a position axially extending outward from a point little off the center and it is connected to the outer circumference through narrow groove 116 to accomplish a smooth rotation thereat. Fingernail shaped narrow grooves 118, 120 are extended into the grooves 112, 114 to eliminate pulsatory change of oil flow as much as possible. A disc member 122, sheet member 124, cylinder member 126 and lid member 128 act as oil conduit constructing members which are integrally assembled, and then fitted into the cylindrical member 100 and bolted down by bolts 130. At the oil exit 132, a spring pin 136 having an inner cylinder 134 is inplanted, piercing through the cylinder member 126 and sheet member 124 completely and piercing half way the disc member 122 and lid member 128. As it is apparent from FIG. 10, a fluid pressure entrance 138 from the hydraulic cylinder 48 raising and lowering the housing 46 is connected to a groove 140 provided at the center of the cylinder member 124 as shown in FIG. 4. The disc 122 is provided one surface thereof with a ring-shaped groove 142 and with four apertures 144, 146, 148 and 150 piercing therethrough as shown in FIG. 7. The aperture 148 is provided at the center and apertures 146 and 150 are located at symmetrical positions. The sheet member 124 is a rubber packing material and is provided with four apertures 152, 154, 156 and 158, as shown in FIG. 8, and acts as a shock absorber of a bolt holder. The aperture 156 is provided at the center and the apertures 154 and 158 are located in a symmetrical positions. The cylinder member 126 is provided with, as shown in FIG. 9, apertures 160 and 162 piercing therethrough, oil seals 164 encircling the circumference at two positions, a plunger 168 located at the cylinder hole 172 and having an oil groove 166 therearound, and a groove 170 having an arc shape. The lid member 128 forms a tick lid member having steps and is provided with, in addition to said oil exit 132 and oil entrance 138, a cylinder 176 having a freely slidable stopper 174 regulating the path of said plunger 168, and a groove 178 cut to communicate the cylinder members 126 and 162 with the cylinder 176. The supporting block 80 of the stopper is fixed onto the lid member 128 by the bolt 184 with an oil seal fixing plate 182, a thin circular plate. a spring 188 is compressed between the spring stopper 194 threadedly connected to the adjusting bolt 186 located at one end of said stopper 174 and the supporting block 180 and effects the stopper 174 to always extend out rightward. A slider 190 is provided at the left-hand end of the stopper 174 and is acting to press the slider 190 toward and onto the face of the cylinder member 126 by means of the spring 192.

Figure 11:
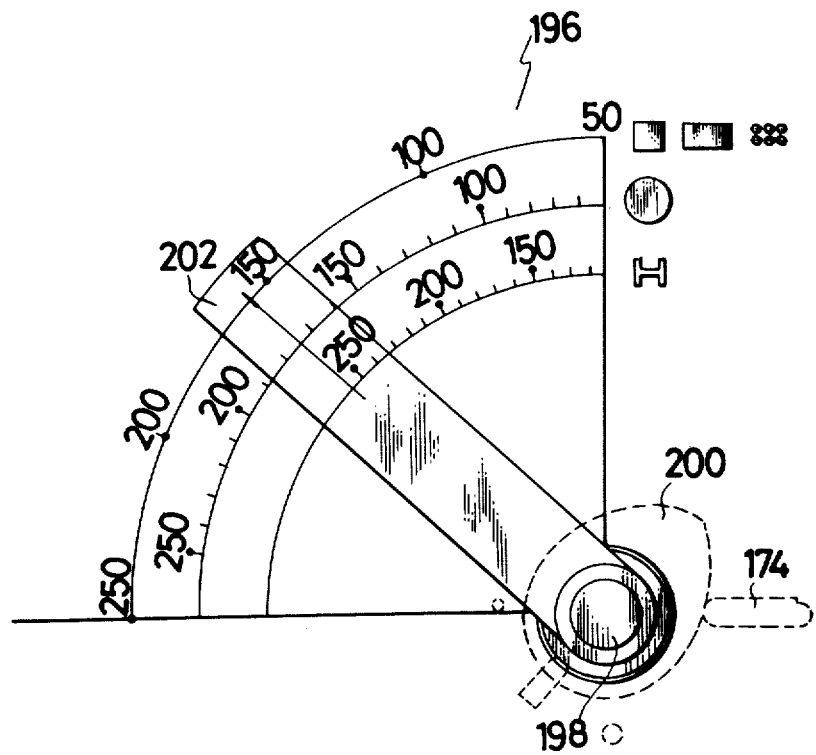
FIG. 11 is an explanatory view showing the adjusting section of the lowering speed controlling mechanism of the housing and the dialling section thereof.

In FIG. 11 showing on enlarged scale the dial 196 of the control box 96 shown in FIG. 1, the stopper 174 designated by a broken line is, in reality, connected to a side of the plunger pump body 62. However, it is shown to be directly connected to the pointer shaft 198 of the pointer 202 of the dial 196 for the sake of convenience, since the stopper and the plunger pump body are interconnected by the universal joint (not shown). In other words, the tip of the stopper 174 is adapted to abut to a cam 200 by the action of the spring 188.

Figure 12:
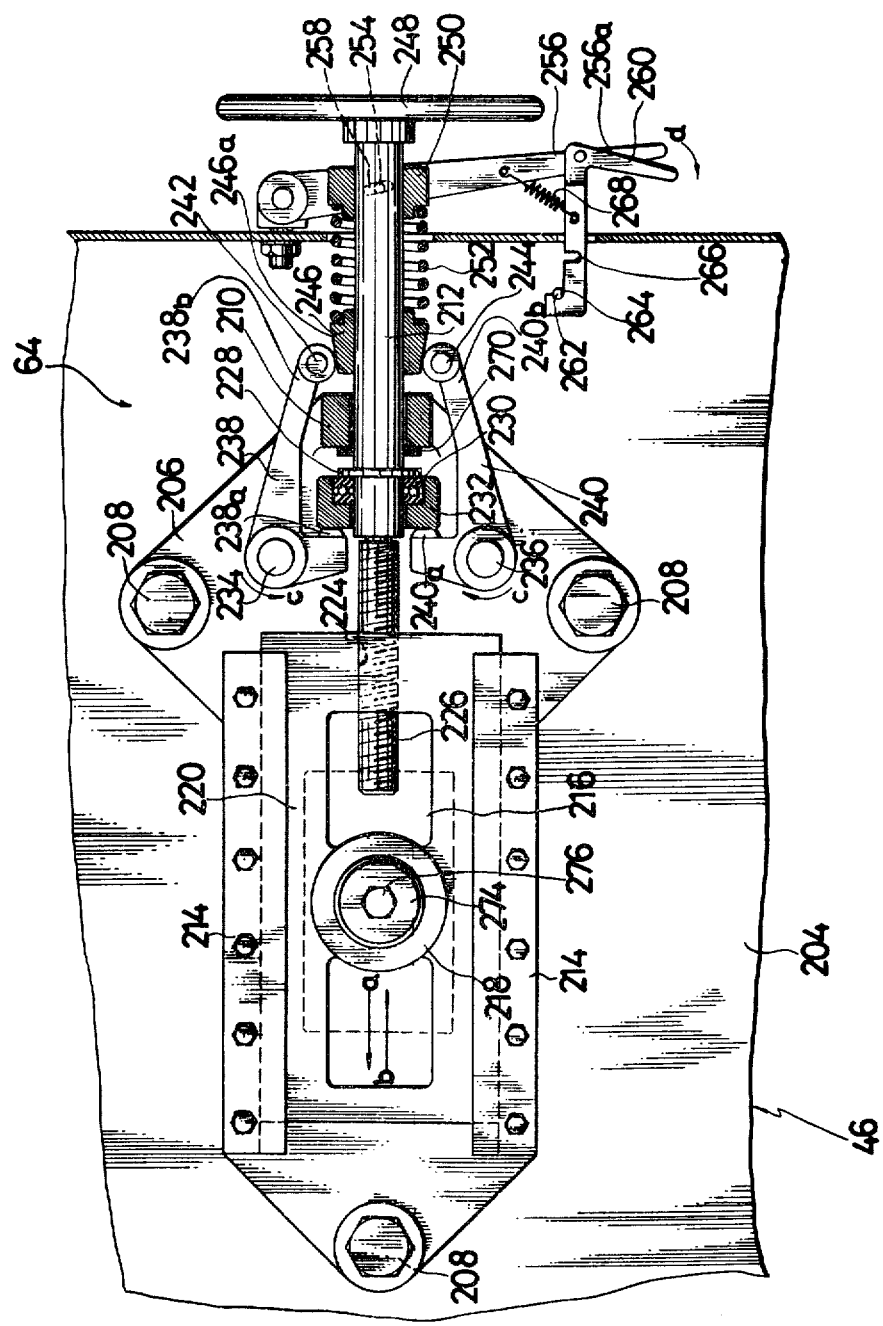
FIG. 12 is a fragmentary rear view partially in section of the band saw blade tensioning mechanism forming one of the features of the machine of the invention.

There is shown in FIG. 12 a tensioning mechanism 64 for the band saw. A casted base 206 is secured by means of three bolts 208 to a bottom face of a back plate 204 of the housing 46 which accommodates the follower wheel 52. A boss 210 provided at the right-hand edge of the base 206 receives thereinto a shaft 212 for free rotation and for free leftward and rightward sliding movement. A guide rail 214 arranged parallel to upper and lower portions of a left-hand section of said base 206 receives thereinto a sliding piece 220 for leftward and rightward sliding movement. The sliding piece 220 extends out from an opening 216 provided at the back plate 204 and has a bearing 218 supporting the wheel shaft 272. A threaded portion 226 formed at a left-edge portion of the shaft 212 is threadedly engaged into a threaded hole 224 located at the right-hand edge of said sliding piece 220 for free backward and forward movement. A ring member 232 is rotatably received through a thrust bearing 230 at the leftward section relative to a flange 228 provided at the central portion of said shaft 212. Two round bosses 234, 236 interposed on the shaft 212 at the right-hand portion of the base 206 are, respectively, connected pivotally for free rotation to bell cranks 238, 240 which left-edge members 238a, 240a are arranged to contact with the left-edge face of the ring 232. Rollers 242, 244 mounted on the right-edge portion are arranged, respectively, to contact with a tapered face 246 of a tapered ring 246 slidably received in the shaft 212. A handle 248 is fixedly connected at the portion at which the shaft 212 extends rightward from the back plate 204. At the same portion, there is slidably received a spring holder 250. Between said spring holder 250 and the tapered ring 246 is carried a relatively strong spring 252. A pin 254 formed extending out of both side portions of the spring holder 250 slidably fits into an elongated hole 258 of a lever 256, base of which is rotatably mounted on the housing 46.

Detachable detent holes 264, 266 and a pin 262 fitted on the bottom face of the back plate 204 are formed at a trigger 260 pivotally mounted to the forward edge portion 256a of said lever 256. Furthermore, said trigger 260 and lever 246 carry a compression spring 268 therebetween. A shock absorber 270 of an elastic material such as a rubber is fitted at the left-edge portion of the boss 210, surrounding the shaft 212.

There is described hereinafter a slip sensing mechanism 66 shown in FIG. 13. A wheel 272 is fixed by a bolt 276 and washer 218 to a bearing 218. Said followable wheel 52 is rotatably mounted through double layers of conical roller bearings 278, 280 to said wheel shaft 272. Furthermore, a cover 284 is firmly fixed by bolts 292 onto an upper face of a boss 52a of the follower wheel 52, three blades 286 with constant width are located equally spaced apart and extending horizontally outward from a side of the outer surface of the cover 282 and disc 288 are attached to the cover 284 by adjust collars 290 and bolts 292 underneath the blades 286 with a suitable distance apart. The upper portion of the wheel shaft 272 is designed to extend through and extend out of the cover 284, an arm member is placed on a side of the upper portion of the wheel shaft 272 and a no-contact type switch 296 is placed at the tip of the arm member 294 and close to the blades 286. This no-contact switch 296 is connected through a line 298 to a motion detector 300 shown in the block diagram of FIG. 14. Still furthermore, a cover 301 covering over the no-contact switch 296 and the blades 286 is provided at the tip of the wheel shaft 272. This cover, combined with said discs 288, acts to protect the non-contacting switch 296 and the blades 288.

The above-mentioned motion detector 300 is a kind of control relay serving for automatically detecting a drop in speed of the driven wheel 52 which should be rotated at a speed within a control range. Referring to the block diagram, there are shown at A and a.c. source, at B a transformer, at C a rectifier, at D a constant-voltage circuit, at E a negative-amplifier circuit, at F a differentiation circuit, at G a discharging circuit, at H an integrating circuit, at I an SCR circuit (silicon controlled rectifier), at J an electro-magnetic relay, at K a starting compensator timer, and at L an external re-set.

Figure 16:
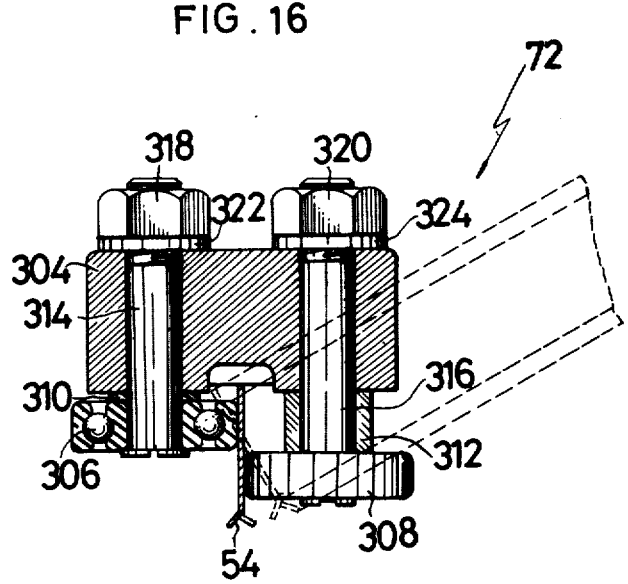
FIG. 16 is a cross-sectional view taken along line 16 — 16 of FIG. 15, with portions thereof being omitted for simplification of illustration.
Figure 15:
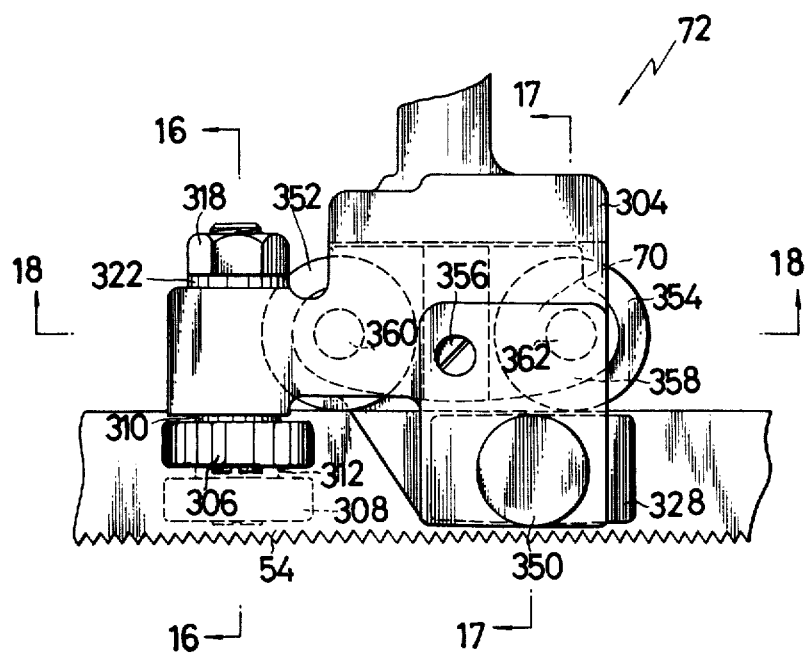
FIG. 15 is a front elevation on enlarged scale of the band saw blade guide mechanism forming one of the features of the machine of the invention.

The guide mechanism 72 of the band saw 54 will now be discussed in more detail. Each of the opposingly located guide mechanisms 72 includes a guide block member 304 which is supported by a guide bracket 74 pendent from the housing 46, said guide block member 304 being provided on the saw wheel side with an upper guide roller 306 and a lower guide roller 308 as shown in FIGS. 15 and 16. The upper and lower guide rollers 306 and 308 are rotatably mounted in position with use of adjustment rings 310 and 312, attaching bolts 314, 316, nuts 318, 320, washers 322, 324, the upper guide roller 306 being in abutment against the upper portion of one side face of the saw blade while the lower guide roller 308 is held in abutment against the lower portion of the other side face of the saw blade. The saw blade 54 is turned to pose perpendicular to the plane of the workpiece M by the cooperating action of the two guide rollers. The two guide rollers are adjusted toward or away from each other depending upon the width of the saw blade to be used.

Figure 19:
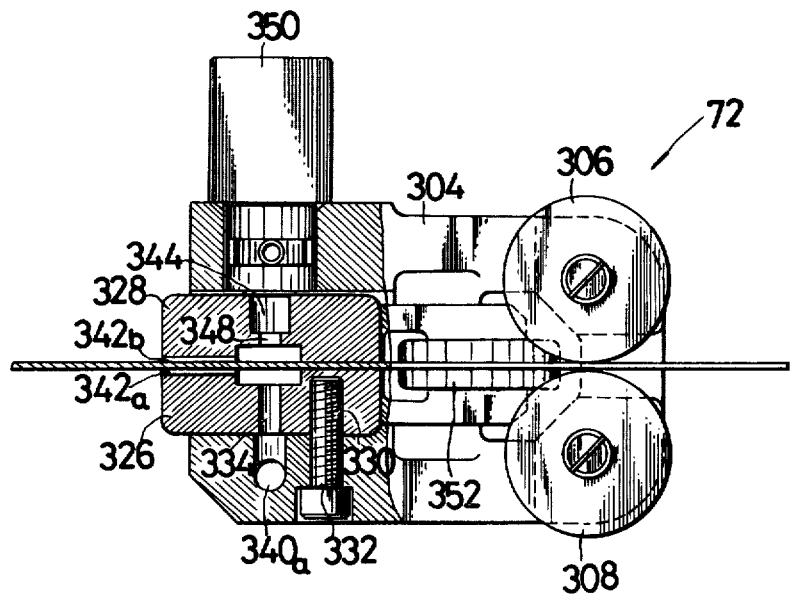
FIG. 19 is a bottom view partially in section of the band saw blade guide mechanism shown in FIG. 15.
Figure 20:
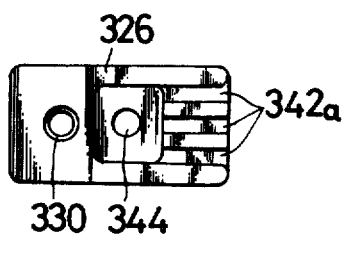
FIG. 20 and FIG. 21 are front views of the plate-like guide members provided on the left and right side of the band saw blade guide mechanism.
Figure 21:
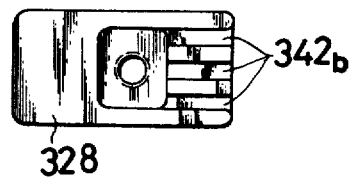
Figure 22:
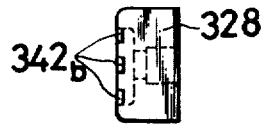
FIG. 22 is a side view of the plate-like guide members shown in FIG. 21.
Figure 23:
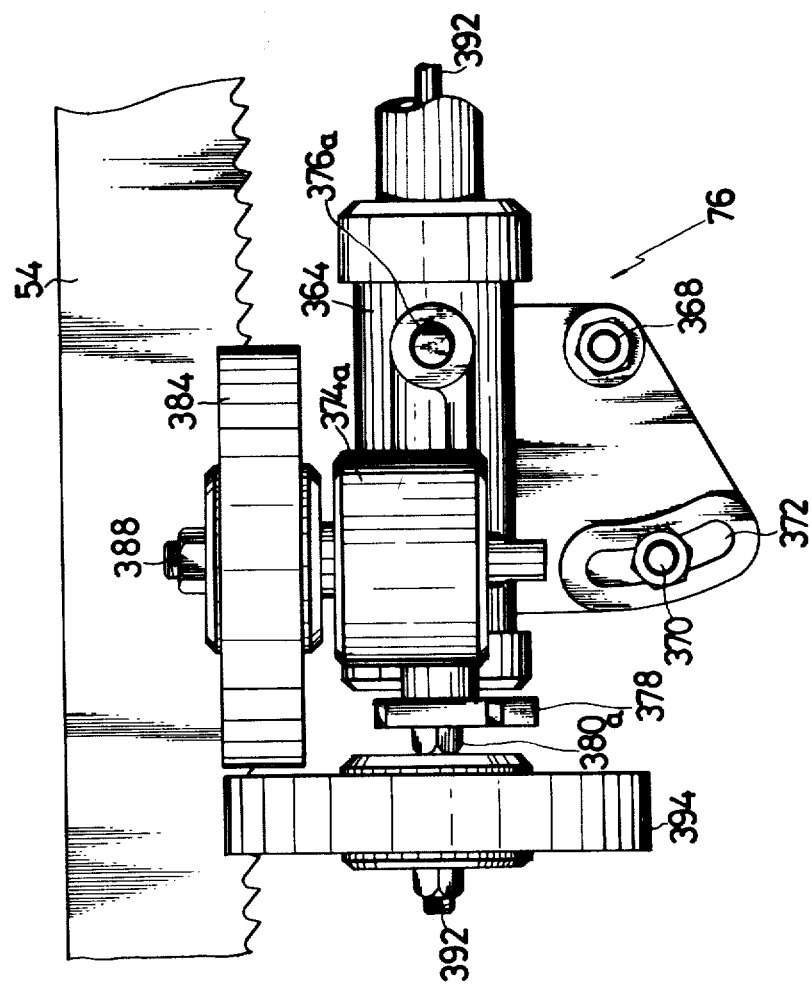
FIG. 23 is a front view on enlarged scale of the wire brush mechanism forming one of the features of the machine of the invention.

On the workpiece side of the guide block 304 there are provided insert blocks 326, 328 of the cutting oil feeding means 68, said insert blocks 326, 328 serving also as guide plates for compressingly guiding both sides of the band saw 54 as shown in FIGS. 15, 17 and 19. These insert blocks 326, 328 are formed by a process comprising a precision casting, threading, reaming, polishing, and finally a surface treatment by such a material as a titanium carbide to secure the surface which contacts with the band saw 54 with a hardness close to that of an extremely hard material. The insert block 326 is, as shown in FIG. 19, fixedly connected to the guide block 304 by a threaded hole 330 and securing screw 332. An oil conducting aperture 334 receives cutting oil from a differential diameter nipple 336 and deliver the cutting oil through conduits 338, 340a which passes through the guide block 304, and shoots the oil long both sides of the band saw 54 from grooves 342 of the insert block 326. As shown in FIGS. 20, 21, the structure of the insert block 328 is similar to that of the insert block 326 except that there is arranged no securing screw 332 and it is adapted to press the band saw 54 with a predetermined pressure by the function of a sliding member 433 and spring 346. An oil conducting aperture 348 is provided to pass through the sliding member 344, as in the case of the insert block 326, to supply cutting oil to the band saw through the conduit 340b and groove 342b. The cap 350 accommodates therein a spring member 346 and is threadedly attached to the guide block 304.

Figure 18:
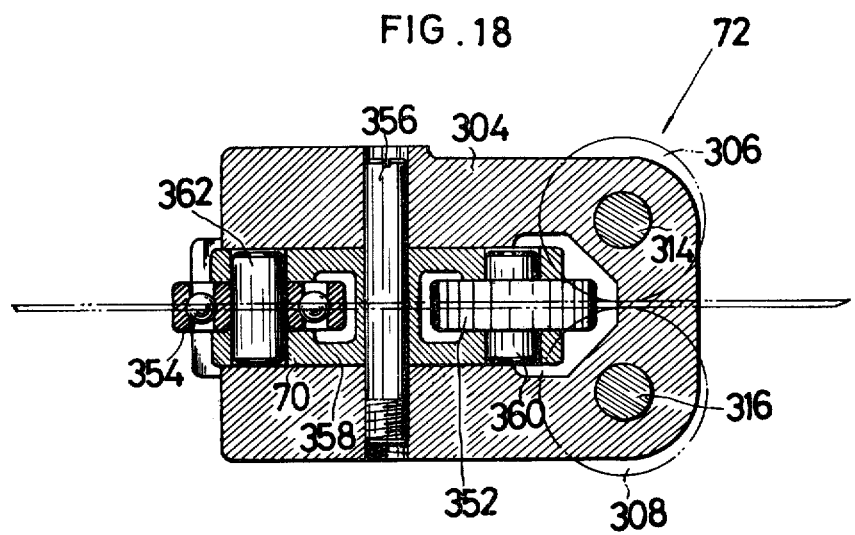
FIG. 18 is a cross-sectional view taken along line 18 — 18 of FIG. 15.

The guide blocks 304 of the guide mechanism 72 are further provided, as shown in FIGS. 15, 17 and 18, with band saw back supporting means 70 each having a roller or radial ball bearing and held in rotatably in symmetrical position by a center pin 356. That is, guide block member 304 is downwardly bifurcated like a york and an H-shaped see-saw block member 352 is provided in the web section thereof with a pin member 356 secured to the legs of the york portion of the guide block member 304. The band saw back supporting means 70 further includes a roller using a radial bearing which is received in the inner space of the H-shaped see-saw block member 358 and rotatably supported on shaft 360, 362. Thus the band saw back supporting means 70 is pivotally supported by the pin member 356 of the see-saw block member 358 thereby to regulate the back portion of the band saw 54, to impart attacking pressure to the cutting material through the saw blade 54 and to prevent the saw from being warped upwardly by the attacking pressure while in travel.

Figure 3:
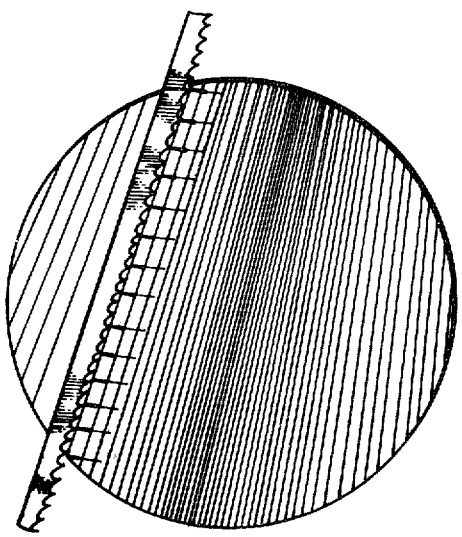
FIG. 3 is a view showing variations in the cutting speed when cutting a workpiece in the nature of a round rod.
Figure 24:
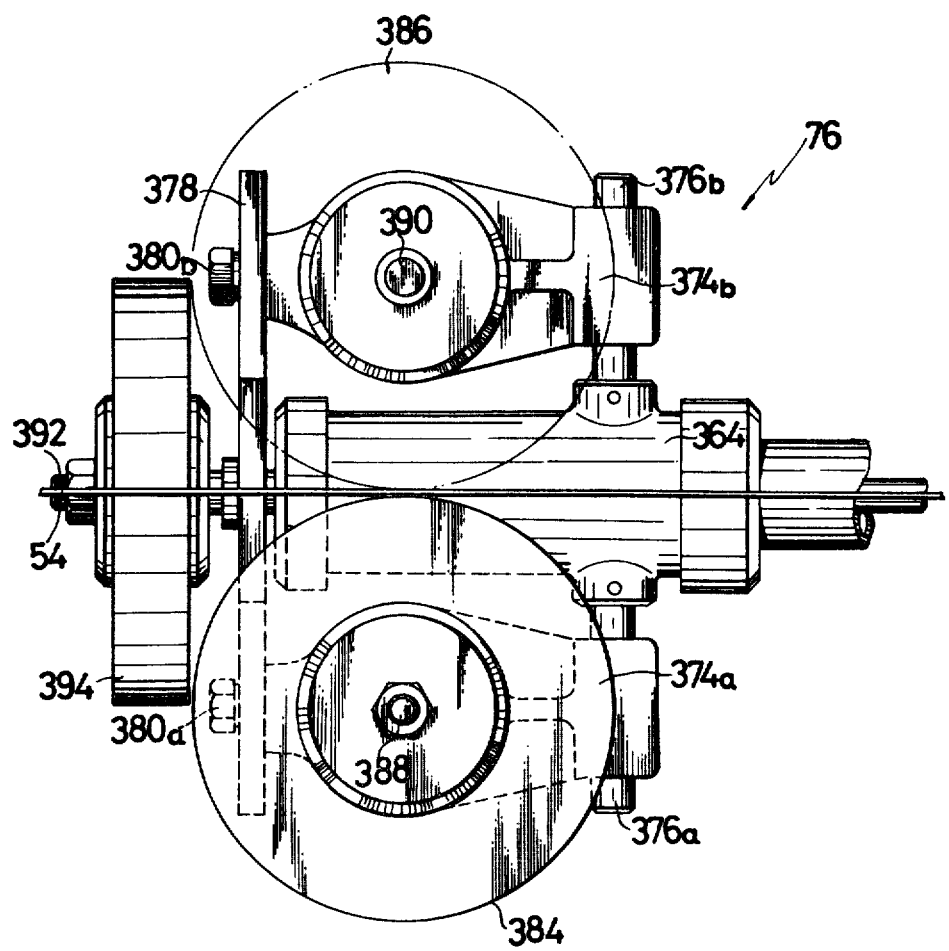
FIG. 24 is a front view of the wire brush mechanism shown in FIG. 23.
Figure 25:
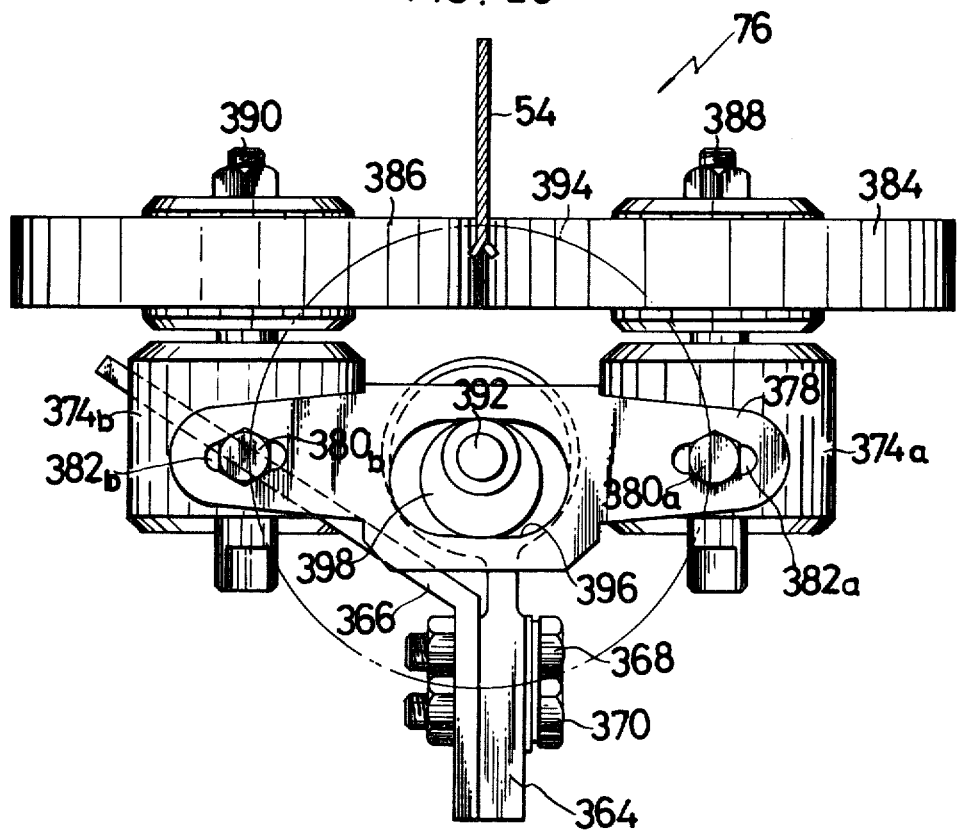
FIG. 25 is a side view of the wire brush mechanism shown in FIG. 23.

Referring in more detail to the wire brush mechanism 76, a wire brush base structure 364 is mounted on a lower end of supporting member 366 by means of bolts 368, 370 at the right-hand end of the housing 46 so as to be located beneath the saw blade 54, that is, in a position adjacent to the band saw blade which has just cut through the workpiece, as shown in FIGS. 3, 24 and 25. The bolt 370 is passed through an elongated hole 372 so that the position of the wire brush base structure 364 may be angularly adjusted with respect to the housing 46. Brush supporting members 374a, 374b have one ends thereof pivotally connected to respective supporting shaft members 376a, 376b vertically projecting from opposite sides of the wire brush base structure 364. The other ends of the brush supporting members 374a, 374b are secured by bolts 380a, 380b to a plate member 378 located in front of the wire brush base structure 364. The plate member 378 is provided with elongated bolt holes 387a, 387b so that the brush supporting members 374a, 374b may be adjusted toward or away from each other. Driven or follower wire brushes 384, 386 are respectively rotatably mounted on rotary shafts 388, 390 projected centrally from the upper faces of the wire brush supporting members 374a, 374b, the follower wire brushes sandwitching therebetween the band saw blade 54 and moving by following movement of the band saw 54. A driving shaft 392 is located substantially immediately beneath the band saw blade 54 and disposed parallel to the travelling direction of the band saw blade 54. The driving shaft 392 is passed through the wire brush base structure 364 and through an oval hole or aperture 396 bored in the central portion of the plate member 378. At the fore end portion of the driving shaft 392, there is pivotally mounted a driving wire brush 394 which is adapted to contact the bladed portions of the band saw 54 mainly from beneath. Further, an eccentric cam member 398 is mounted on the driving shaft 392 at the portion which is passed through the oval-shaped aperture 396, the cam 398 being in spherical engagement with the aperture 396.

Referring next to the detecting mechanism 88 for detecting conditions of the workpiece, a casing box 400 is mounted rearward of the fixing side of the vice jam 402. As shown in FIGS. 26 and 27, this casing box 400 comprises an upper and lower plate members 404, 406 and a side plate member 408 which is securely connected to the fixing side of the jaw 402, each plate member being formed from a relatively thick iron plate and covered by relatively thin back plate member 410 and side plate member 412. A first wing member 414 is pivotally supported by pin members 416, 418 between the upper plate member 410 and the lower plate member 406 and which is constantly tensioned by a bolt member 420 and a spring member 422 in clockwise and counterclockwise directions as viewed in FIGS 28 and 29. A second wing member 432 is pivotally supported at the upper and lower pivoting portions 424, 426 of the first wing member 414 by means of pin members 428, 430 in such a manner that the fore end portion of the second wing member 432 is disposed perpendicular to the plane of the cutting material or workpiece M. A bolt 434 is provided at substantially intermediate level between the upper and lower ends of the second wing member 432, the bolt 434 being located in an offset position with respect to the axis of the pin members 428, 430. The second wing member 432 is interposed between washers 436, 438 and compressed against the head of the bolt 434 by means of a spring member 440, so that the second wing member 432 may rotate about the axis of the pin member 430, 428 against tension in the spring 440 in clockwise direction as seen in FIGS. 28 and 29.

There are shown at 442 a hydraulic cylinder and at 444 a piston thereof, which are operated in a synchronized relation with the aforementioned feeding vice mechanism 86. A spring 446 is interposed between the piston 444 and the bottom of the cylinder 442. The second wing member 432 is connected to the piston 444 by means of a rod 448 which has the upper and lower ends thereof formed round. There is provided a clearance between the second wing member 432 and the piston 444 thereby to allow the second wing member 432 to rotate in the clockwise direction as mentioned hereinabove. A microswitch 450 has at the head portion thereof a roller member 452 which is extendibly or retractibly supported on a shaft 452. This shaft 452 is extendible or retractive such that the roller may follow the movement of the second wing member 432 so as to actuate the microswitch even if the contacting point 452a of the roller 450 which is in engagement with the shoulder portion 454 of the second wing member 432 in FIG. 29 is shifted away from the shoulder portion or even if the second wing member 432 is rotated in the clockwise direction.

There is shown at 458 a spacer member which is adapted to adjust the position of the microswitch 450 vertically. Also rightward or leftward displacement may be achieved, as for example, by forming the bolt hole in an elongated form. A butterfly-bolt 460 retains the second wing member 432 in a retracted position as shown in FIG. 27, so that the machine of the invention may be made inoperative when the workpiece M becomes too small. A bolt member 462 is employed for restricting the clockwise pivoting angle of the second wing member 432 to prevent the rod member 448 from being damaged.

Referring to FIGS. 30, 31, the feed roller mechanism 90 includes a guide plate member 466 mounted on the upper surface of the base structure 42, a fixed vice jaw 464 secured to the righthand side of the guide plate 466 by a bolt 468, a movable vice jaw 470 mounted on the lefthand side of the guide plate 466 through an adjustment block 472, a toothed rack 474 slidably mounted beneath said movable vice jaw 470 for sliding movement in the left and right directions with a compression spring 478 interposed its lefthand end a portion 42a of the base 42. A detent lever 478 is extended rearward from the rear end of the adjustment block 472 and engaged at its extreme end with one of the recesses on the toothed rack 474. A carrier 480 is provided beneath the guide plate 466 between fixed vice jaw 464 and movable vice jaw 470 and formed with a pair of bearing holes 482a and 482b towards its lower portion, for rotatably receiving a pair of offset cams 486a and 486b, respectively, which in turn are fixedly mounted on shafts 484a and 484b supported for free axial rotation at both ends thereof on the base 42, the supporting means being not shown in the drawings. A feed roller 490 is rotatably carried by support arms 488a, 488b which are projected upwardly from the ends of the carrier 480. A universal joint 494 is interposed on the shaft 492 extending from the left-hand end of the feed roller while a ratchet wrench 496 is attached to the fore end portion of the shaft 492. One ends of operating arms 498a and 498b are connected to rotary shafts 484a and 484b while the other ends are pivotally connected operating rod 500. A double acting cylinder 502 is secured to a portion 42b of the base 42. A piston 504 is slidably received in the cavity of the cylinder 502 and has a piston rod 506 of larger diameter and a piston rod 508 of smaller diameter secured to and extended from the two opposing ends thereof. A link bar 510 is pivotally connected at one end thereof to the piston rod member 506 and provided with an elongated hole 512 at the other end for slidably receiving a pin member 514 formed on the operating rod 500. A see-saw lever 516 is pivotally mounted on a portion 42c of the base 42 with the upper part thereof engaging with a boss 518 provided at the lefthand end of the toothed rack 474 and the lower part thereof detachably engaging with the free end of the piston rod 508. In the drawings, the reference numeral 520 designates a stopper for the operating rod 500 and 522 shows a stopper for see-saw lever 516, both of which are suitably secured to the base 42, though these are omitted from the drawings.

Referring now to FIG. 32 showing a hydraulic circuit for the feed roller mechanism 90, the reference numeral 524 shows a three-way valve, 526 denotes a drain circuit, 528 an oil reservoir, 530 a hydraulic pump, 532 an electric motor, 534 a check valve, 536 a tappet cylinder, 538 a switch for the motor 532 actuatable from the tappet cylinder 536, the reference numerals 540, 542, 544, 546 indicate oil conduits.

Referring to FIG. 33, FIG. 34 and FIG. 35, a product clamp mechanism will now be described. A fixed fence 548 is provided on a floor 92a of a carrier 92 on the same side as a fixed vice jaw 464 of a main body vice mechanism 78. On the same side as that of the movable side vice jaw 470 is situated a movable fence 550 holding workpiece Ms in place loosely and movable along long grooves 552a, 552b located in the floor 92a of the support block 92 in a manner later described. The movable fence 550 is reinforced by suitable ribs 554 and is provided at the bottom with attachment metal fittings 556a, 556b having fitting bores 558a, 558b. The movable fence 550 is mounted onto the floor 92a of the support block 92 by hooks 560 as illustrated in detail in FIG. 36 and FIG. 37. That is, the hook 560 is formed of a short tough material having an extended seat portion at its lower part and having a bolt welded at the top. The hook is inserted from one end of the groove 552a or 552b cut in the floor 92a of the suppporting block 92 and at a suitable position of the movable fence 560, it is inserted into the attachment aperture 558a or 558b and fixedly connected by the nut 564a or 564b to the attachment metal fixture 556a or 556b. The desirable position for fixedly connecting the movable fence 550 is move or less equal to but slightly wider than the distance between the fixed vice jaw 464 and the movable vice jaw 470.

With reference to the mechanism of pivotal connection between the base 42 of the machine apparatus 40 and the housing 46 according to the present invention, as shown in FIG. 38, a slit 568 is provided at the hinge pin seat 566 of the housing 467, facilitating clamping adjustment by the bolt 70 and the lock nut 572. Some free space or gap between the hinge pin and the hinge pin seat 566 and hinge bracket 574 located on the base 42 facilitates their assembly, however, an excessive gap here causes undesirable deflection of the housing 46 in the left-right and backward-forward directions to lower precision during cutting operation. Thus, by providing a slit 568, it is possible to pivotally connect the housing in a very stable condition by fixedly connecting the hinge pin 44 by the bolt 570 and the lock nut 572 at the hinge pin seat 566 with no gap of the kind previously described but providing sufficient tightening margin and at the hinge bracket 584 a suitable gap after a proper position of the hinge pin is determined.

An example of operation of the machine 40 will now be described. In order to tension the band saw 54, a trigger 260 (shown in FIG. 12) is first pulled, engaging detent hole 264 with pin 262 and leaving a lever 248 in a position shown in FIG. 12, and a handle 248 is rotated counterclockwise moving a sliding piece 220 along a guide rail 214 in the leftward direction as seen from in FIG. 12 (in the direction of the arrow a), whereby a follower wheel 52 is moved closer to a drive wheel 50 making the mounting of the band saw 52 around the both wheels easier. Then the handle 248 is rotated clockwise to shift the sliding piece 220 rightward (in the direction of the arrow b) whereby effecting tensioning of the band saw 54. The reaction of this force of tension pulls the shaft 212 in the direction of the arrow a causing a tapered ring 246 which is prevented by a spring 252 to move in the direction of the arrow b, to move along with the shaft 212 in the direction of the arrow a, whereby effecting to rotate bell cranks 238, 240 contacting with tapered face of the tapered ring, axially centering around circular bosses 234, 236, respectively, in the direction of the arrow c. With the rotation of said bell cranks 238, 240 left-end members 238a, 240a press a ring member 232 in the direction of the arrow b, pushing back the shaft 212 in the direction of the arrow b whereby assisting the operation to rotate the handle 248. When the handle 248 is rotated further, tension of the band saw 54 is increased and the spring 252 is compressed. The lever 256 is then rotated in the direction of the arrow *d* after the band saw 54 is manually tensioned to a full extent by the operator, by engaging a dentent hole 266 of a trigger with a pin 262 to securely fix said lever thereonto. At this instance, a spring holder 250 slidably moves in the direction of the arrow *a* whereby the spring 252 is compressed further effecting the band saw 54 to be tensioned with even greater force.

The cutting operation is carried out under the foregoing condition and when there occurs elongation in the band saw 54 causing tension to be decreased thereat, that is, decrease in the force that pulls the shaft 212 in the direction of the arrow *a*, the force which pulls the shaft 212 in the direction of the arrow *b* becomes dominant due to coiling force of the spring 252 and due to bell cranks 238, 240, whereby the shaft 212 is moved in the direction of the arrow *b* until recoiling force of the spring 252 becomes balanced by tension force of the band saw 54 and the tension force is readjusted automatically to a proper level.

When the band saw 54 becomes broken during cutting operation, the force pulling the sliding piece 220 in the direction of the arrow *a* is suddenly lost and as a result the shaft 212 is snapped in the direction of the arrow *b*. A possible damage of the structure, however, is prevented from occuring since the flange 228 is adapted to strike against the shock absorber 270 and the impact shock is thereby absorbed.

Furthermore, even if there is a small error in the total length of the band saw 54 welded in the form of a ring, the shaft 212 only rotates at the location indicated in the figures and does not involve itself in any force balance relationship dynamically while the handle 248 is rotated and the sliding piece 220 is lightly moved in the direction of the arrow *b*. Band saw tensioning step by the manual handle 252 and a relatively weak tension is applied. In the step to actuate the lever 256, there is applied a significantly large pre-load to spring 252 and the pre-load is magnified by the tapered ring 246 and the bell cranks 238, 240 which function as levers, whereby achieved predetermined tension of the band saw which is considerably larger than that obtainable by manual rotation of a handle 248 with a short arm.

With reference to FIG. 31, operation of feeding a workpiece M will now be discussed. Referring to FIG. 32, when the three-way valve 524 is switched over (as shown in FIG. 32), the oil conduits 540 and 546 are connected hydraulically with each other, resulting in the hydraulic pressure reduction in oil conduit 544 and energization of the motor 532 through the medium of tappet cylinder 536. When the electric motor is, thus, energized and the hydraulic pump 530 actuated, the pressure oil is supplied simultaneously to the right-hand side of the piston 504 through oil conduit 544 and to the left-hand side of the piston 504 through oil conduit 540. But, due to the difference in effective area between the two sides of the piston 504 on which acts the hydraulic pressure, the oil pressure acting on the left-hand side face of the piston 504 through conduit 540 overcomes that acting on the right-hand side thereof, thus, causing the displacement of the piston 504 in the direction shown by the arrow *e*. When the piston 504 is displaced in this way, a see-saw lever 516 is released, and the toothed rack 474 is urged to move in the direction shown by the arrow *f* under the action of the compression spring 476. The movable side vice jaw 470 of the main body vice 78 is, thus, receded for releasing the workpiece M. As the piston 504 is further moved in the direction of the arrow f, the see-saw lever 576 is swung as shown by the arrow *j* and abuts on the stopper 522. At this time, pin 514 abuts on the left edge of the long hole 512. As piston 504 is further moved in the direction shown by the arrow mark *e*, operating rod 500 is displaced as shown by the arrow mark *e*, and the offset cams 486a, 486b are thus turned counterclockwise, carrier 480 is raised in its position and the feed roller 490 slightly emerges from upper surface of the guide plate 466. Simultaneously, the operating rod 500 abuts on the stopper 520 and the tappet cylinder 536 comes into operation in the same way as described before, and the electric motor 532 de-energized. This operative phase is illustrated in FIG. 30. When the workpiece M resting on the feed roller 490 is elevated to a position above the upper surface of the guide plate 466, the workpiece M is fed in and is clamped by the vice mechanism 86. Then, a feeding cylinder 82 is driven, a feeding bed 84 is moved by said feeding cylinder to the side of the main body vice mechanism 78 and the workpiece is fed rolling over a feeding roller 490 by a desired distance. In this instance, when the cutting piece M is clamped by the feeding vice 86, the fore end portion of the second wing member 432 of the detection mechanism 88 adapted to detect the condition of the feeding material is synchronizely abutted against the cutting material M perpendicularly thereto, thereby to check for the presence of the cutting material. When the cutting material is not remaining, that is, when the cutting material is not present, the second wing member 432 is further advanced from the position shown in FIG. 5 and FIG. 5, so that the rearward shoulder portion 454 of the wing member is disengaged from the roller 452 of the microswitch 450 and the microswitch 450 is actuated. When there should occur a slippage between the cutting material M and the feeding vice mechanism 86 during feeding operation, the second wing member 432 is rotated about the pin members 428 and 430 clockwise and the roller 452 of the microswitch 450 is likewise actuated. Since the actuation of the microswitch is inter-related with actuation of a warning device or stoppage of the feeding mechanism so that it will be made possible to take proper measures as soon as the remaining portion of the cutting material becomes too small or there occurs a slip, and to eliminate irregularities in the sawn pieces.

Operation of clamping the cutting piece M following the completion of the feed motion thereof will now be explained. Referring to FIG. 32, when the three-way valve 524 is switched over, the roll circuit 540 is hydraulically connected with the drain circuit 526, and hence the piston 504 is urged to move in the direction shown by the arrow *h* under the action of the remaining pressure oil in the conduit 544. As the hydraulic pressure in the conduit 544 is thus decreased, the piston of the tappet cylinder 536 is urged to move under the action of the enclosed spring, thus actuating the switch 538 and setting the electric motor 532, the pump 530 is set in operation for supplying pressure oil into oil conduit 544. As the oil conduit 540 is connected hydraulically with the drain circuit 526, the hydraulic pressure developed by hydraulic pump 540 is fully exerted on the right-hand face of the piston 504, the latter being thus moved further in the direction shown by the arrow *h* for pulling the link bar 510 as shown in FIG. 30. As the link bar 510 is displaced in this way as shown by the arrow $h$, offset cams 486a, 486 b are set into counterclockwise rotation, under the weight of the cutting piece M resting on the feed roller 490, the carrier 480 being thus caused to descend, and the operating rod 500 displaced as shown by the arrow $h$ through the medium of the operating 498a, 498b, with the pin 514 engaging with the left-hand edge of the elongated hole 61 as before. As the carrier 480 is moved and the feed roller 490 brought to the position lower than the level of the upper surface of the guide plate 466, the workpiece M abuts on the guide plate 466. That is, when the workpiece M no longer acts on the feed roller 490 so that carrier 480 is prevented from moving down any further. At this time, the piston rod 508 abuts on the lower end of the see-saw lever 516. Upon further movement of the piston 504 in the direction of the arrow $h$, see-saw lever 516 is swung in the direction of the arrow $i$, the toothed rack 274 being thus displaced in the direction of the arrow $j$ and the movable vice jaw 470 moved towards the fixed vice jaw 470 for clamping the cutting piece M therebetween. As the movable vice jaw 470 is brought to the workpiece M clamping position, the piston 504 is retarded from moving further and the hydraulic pressure prevailing in the oil conduit 540 is now increased. Thus, the tappet cylinder 536 is actuated for breaking the switch 538 and the operation of the hydraulic pressure source interrupted. This operative phase is illustrated in FIG. 31. When the clamp pressure of the movable vice jaw 470 should be decreased occasionally during the cutting operation with resultant decrease in the hydraulic pressure prevailing the the conduit 544, tappet cylinder 536 is set in operation to automatically compensate for such oil pressure reduction.

In cutting operation of a workpiece of, for instance, square material 155 of SUS-27, after the workpiece is clamped by the main vice mechanism 78 in aforementioned manner, a dial pointer 202 is adjusted to register on "square workpiece — 155," as shown in FIG. 11, and a stopper 174 is pushed in by a predetermined distance by a cam 200 to the position shown in FIG. 4. Furthermore, from a table separately provided, the band saw blade is determined to be high-speed steel of three peaks per an inch and the band saw speed is determined to be 40 meters per a minute. When cutting operation is commenced with above-described cutting factors, a worm shaft 56 is rotated at a rate (revolution/min) corresponding to the band saw running speed to, in turn, rotate the drive wheel 50, whereby effecting the circulating movement of the band saw 54 around the drive wheel 50 and the followable wheel 52, and a distributor 104 of the plunger pump body 62 shown in FIG. 4 is rotated at the same speed with that of the worm shaft. The working oil compressed by the hydraulic cylinder 48 which is due to the weight of housing is lead to the groove 140, and thus the groove 112 and the aperture 146 and then the groove 178 and the aperture 162, filling the hollow member 176, and reaching the groove 170 cut in the shape of an arc. When the distributor 104 is rotated by 180° with the rotation of the worm shaft 56, the pressurized oil of the groove 140 is lead through the groove 112 and the aperture 150 to enter into the aperture 158 located at a lower portion of the seat member 124 in a manner to push the plunger 168 rightward. The plunger 168 first abuts on a slider 190 and the spring 192 of the hollow member 55 pushes in the slider 190 and the plunger 168 moves rightward to the tip of the stopper 174 since the pressurized oil put under pressure by the weight of the housing 46 to set to have the force equivalent to approximately 90 percent of the force pushing the plunger when the band saw 54 is lowered without a load. When this happens, the plunger 168 moves rightward and the quantity of oil equivalent to that flows into the cylinder member 126 is passed through the groove 178 and the aperture 162, and through the groove 114 and the groove 142 of the distributor 104 and through the inner cylinder 134 and the oil exit 132 to the oil tank (not shown) to complete the circulation. In this manner, the housing 46 is lowered and the workpiece M is cut by the band saw at a predetermined speed.

When the distributor 104 is rotated still further 180°, the plunger 168 is, this time, moved leftward and the quantity of oil previously moved by the plunger 168 is emptied out in the cut-in groove 170. As cutting operation progresses and the length of the band saw 54 contacting with a workpiece increases, the effective weight of the housing 46 decreases before the plunger 168 reaches the tip of the stopper 174 and before it balances with the spring 168, whereby said quantity of oil introduced and emptied is reduced and the lowering speed is gradually reduced. Therefore, the positions of the band saw 54 cutting a circular rod at a regular interval of time will appear very close to each other, as shown in FIG. 3, when the cutting length of the workpiece is long. On the other hand, the positions of the band saw at a regular interval will be more widely apart when the cutting length is shorter. Thus, the position of the stopper 174 is kept constant for a given shape and size of the workpiece and the attach lowering speed is also kept constant until the cutting length becomes relatively long.

As for a shape of workpieces which cutting length becomes rapidly long as soon as the cutting starts, a square workpiece will be a good example. A round rod has somewhat this characteristic and as for such workpieces as a H-beam steel, increase of the cutting length appears significantly slow. Furthermore, the magnitude of compressive distortion of the spring 192 is proportional to the force exerted on it, and thus the lowering speed from the beginning of operation tends to be slower as the pointer of the dial 196 is set at a position for a larger workpiece. This is precisely the reason for selecting the dial with the shape and size shown in FIG. 11.

Figure 13:
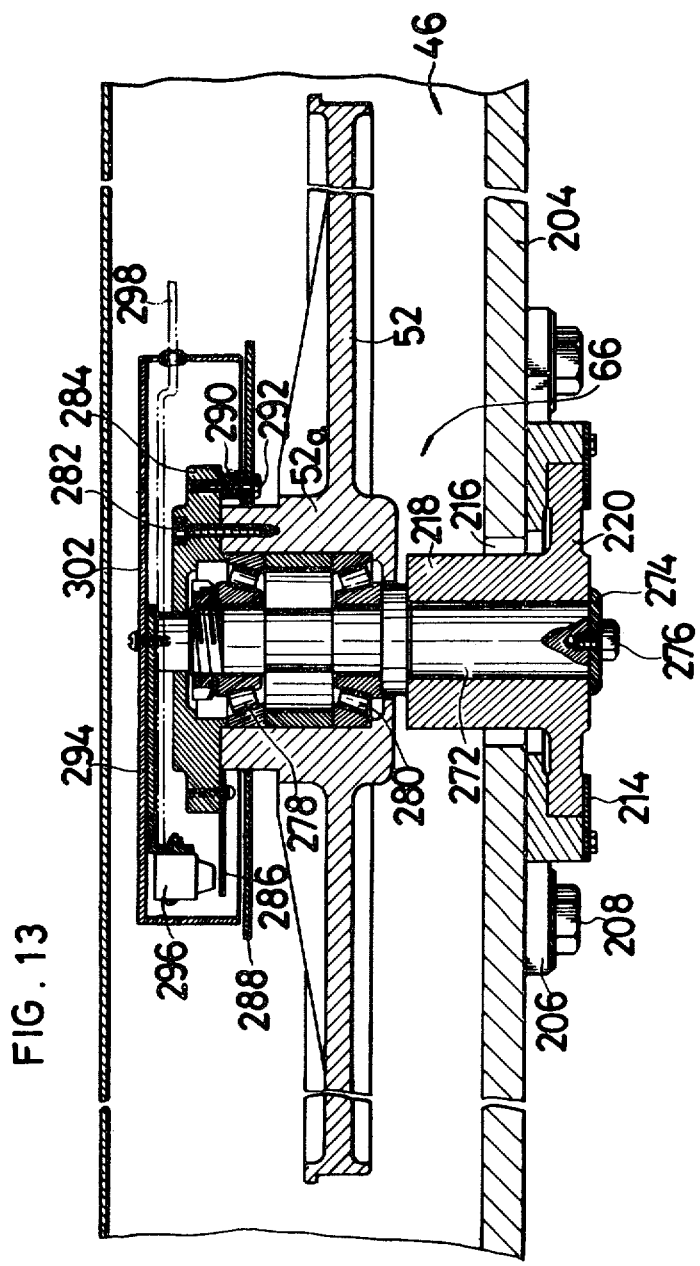
FIG. 13 is a fragmentary sectional view on enlarged scale of the band saw blade slippage sensing mechanism forming one of the features of the machine of the invention.
Figure 14:
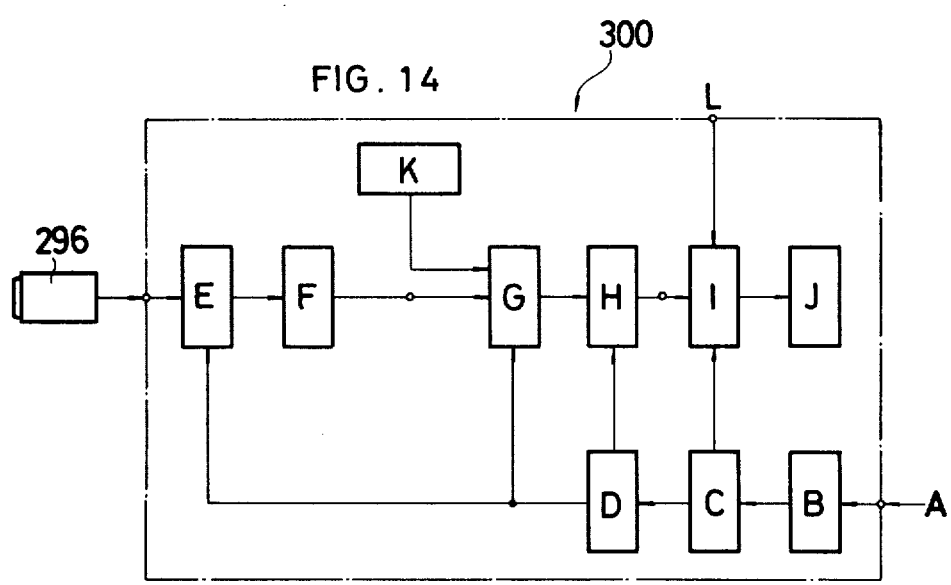
FIG. 14 is a block diagram of the motion detector of the band saw blade slip sensing mechanism shown in FIG. 13.

Whle moving the band saw blade 54 along the circular path of travel around the driving and driven wheels 50, 52, the housing 46 is lowered to cut the workpiece M and each of the three blades 286 of the slip sensing mechanism shown in FIG. 13 approaches the non-contacting switch 296 once for every rotation of the following wheel 52. Thus the non-contacting switch 296 is actuated three times for every one rotation of the follower wheel 52, sending out a pulse of an uniform length at regular frequency, that is, at the rate of three pulses per every one revolution of the follower wheel 52, through a line 298 to a motion detector 300.

Now, when the band saw 54 is moved in the circular path of travel at a predetermined speed in the cutting operation, the non-contacting switch 296 sends out pulses or equal width and of a regular frequency to the motion detector 300. These pulses are amplified one step by a negative amplifier circuit E shown in FIG. 14 and then formed into differential waves in the differentiation circuit F. Gate voltage of the SCR circuit I shows an increase unique to the integrating circuit H according to the particular value of setting rotational speed, but before reaching the striking voltage of arc of the SCR circuit I, discharge through the discharging circuit G with incoming of succeeding differential waves. As a result, potential in the integrating circuit H is reduced nearly to zero and the NCR circuit I is not energized, leaving inoperative the electro-magnetic relay J which is operatively connected beforehand to an electric motor for driving the band saw 54. Thus the band saw 54 continues its circular movement.

When an elongation occurs in the band saw 54 or a slip occurs die up application of too great a load, the rotational velocity of the follower wheel 52 is suddenly and abruptly reduced, causing the width and interval of pulses to become longer. As a result, the gate voltage of the SCR circuit I is increased up to the arc striking voltage of the SCR circuit according to a particular value similar to that mentioned above. With application of a pulse signal to the gate of the SCR circuit I and with energization of the same, the igniting relay J is actuated, with the result that the band saw 54 is held in its stop position and feeding of the cutting material toward the saw blade is brought to a halt. The SCR circuit I keeps its energized condition once it is striken even if there is no longer any pulse signal coming into its gate. This means that even if the voltage in the integrating circuit H is reduced to zero, after energization of the SCR circuit I, the electro-magnetic relay J is kept operative and the band saw 54 is held in its stop position.

When it is desired to restore the cutting operation, a signal is sent from an external re-set L to negatively bias the SCR circuit I thereby to restore the electro-magnetic relay J and start the electric motor.

Furthermore, by providing a starting compensator timer K, it will be made possible to stop the motion detector 300 until a rated speed is reached since the electric motor is actuated, and by setting time constant taking into consideration allowable cutting resistance in view of strength of the band saw used, as the pulse changes when the cutting resistance is applied to the band saw, it will also be made possible to stop the whole operation only when there occurs a slip for protective purposes. As described earlier, the band saw 54 applied around the drive and follower wheels 50, 52 and inclined at a predetermined angle must be turned vertically up by twisting movement at the cutting operation section as seen in FIG. 16. In order to achieve this turning up, with respect to the center of the saw band 54, the upper portion is pressed rightward by the upper guide roller 306 and the lower portion is pressed leftward by the lower guide roller 308. The band saw 54 keeps its right up position after passing by workpiece and up until it passes through the guide block 304, after which the drive wheel 50 gives it a predetermined inclination to continue the cyclic movement.

The upper and lower guide rollers 306, 308 are separate rollers for the upper and the lower half of the band saw 54 and each of them has the necessary width for this purpose. The guide rollers press the band saw only from one side, and thus the possibility of a band saw body damage occuring from pressing the entire face of both sides of the band saw is eliminated. This is due to the fact that, even if the guide rollers 306 and 308 encounter some saw dust, the saw band 54 moves away from the rollers to spaces provided on the opposing side of the band saw with respect of the side pressed by the rollers, whereby preventing the occurence of overloading. This effect is also significant. Said guide rollers 306, 308 rotate following the moving band saw and the wear and tear of the rollers are, therefore, rather small. It is, however, also possible to use a flat guide member made of an extremely hard material for this purpose to have a flat surface contact with band saw.

The insert blocks 326, 328 of a side block 304 grippingly press both sides of the band saw 54 which is virtically turned up, absorbing vibration of the band saw while supplying cutting oil to both sides of the band saw 54.

The cutting oil which is introduced from the differencial diameter nipple 336 and delivered through the guide block 304 by conduits 338, 340a and 304b and passing through the oil conducting apertures 334, 348 and shot through grooves 342a, 342b of the narrow space inside of the insert blocks 326, 328 is made to form a thin layer closely attached and covering the band saw 54. Furthermore, the feeding speed of this layer of cutting oil into a workpiece may be made greater than that of the moving speed of the band saw 54 in the same direction. In the manner heretofore described, cutting oil is easily spread uniformly throughout the surface of the band saw 54 and the quantity of cutting oil flying about and scattering out is minimized to supply the cutting oil to a cutting piece M efficiently, whereby increasing the operational life of a band saw 54 and reducing the consumption of cutting oil. Furthermore, insert blocks 326, 328 are pressed onto the band saw 54 by springs 346 with a predetermined force, and thus helping to keep the band saw in a proper vertical position without gripping the band saw 54 with an excessive pressure.

Where there should occur a upward warp deformation in the band saw blade 54 due to attacking pressure of the cutting material M, the roller surface of the rollers 352, 354 of the band saw back supporting means 70 may be held constantly in contact with the back of the saw blade by the pivotting movement about the pin 356 of the see-saw block member 358 so that there will not be the least possibility of the contacting surface of the roller being influenced by the arcuate deformation of the saw blade 54 and a distinctive effect may be obtained in preventing crushing deformation of the back portion of the saw blade 54.

Then the band saw 54 is put into travel for carrying out the cutting operation. The driving wire brush 394 of the wire brush mechanism 76 is rotated by the driving shaft 392 in a direction perpendicular to the travelling direction of the band saw 54 and removes the sawdust deposited on the saw adjacent to the bladed portions thereof. At the same time, the plate member 378 is vertically reciprocated by the eccentric cam member 398, so that the brush supporting members 374a, 374b are pivotally moved about the supporting shafts 376a, 376b. The follower wire brushes 384, 386 are, while being moved up and down, rotated in the same direction with the band saw 54 by following the movement thereof, thereby to completely remove the sawdust sticking to the side faces of the band saw 54.

By the operation of the machine 40 discussed above, the workpiece M cut from above by the saw blade 54 into desired lengths. However, the sawn pieces are retained in piled position without being dropped by the combined action of the stationary fence 548 and movable fence 550 of the clamping mechanism 94.

Upon completion of a first one cycle of cutting operation, the housing 46 is moved upward by the action of the hydraulic cylinder 48 and stopped in its upper position. The main vice mechanism 78 then releases the workpiece M which is advanced by a predetermined distance on the base 42 in the manner described herein above. The main vice mechanism 78 then securely clamps the succeeding workpiece M and the housing 46 is lowered for commencement of the second cycle of operation. While the succeeding workpiece M is fed along the base 42, the sawn piece may be further advanced under the guidance of and between the fixed fence 548 and movable fence 550. The cutting operation is thus repeated and the sawn pieces are regularly advanced and received into a container (not shown) from the fore end of the carrier 92. The sawn piece clamping mechanism 94 may be used advantageously especially when the workpiece are cut in a piled condition as shown in FIGS. 33 and 34.

What we claim:

1. A horizontal band saw machine having a band saw trained in endless fashion about a driving wheel and a follower wheel, comprising a shaft movable along the axial direction of said wheels, a sliding piece acting as a supporting member for said follower wheel, a handle provided at each end of said shaft, a flange provided between said shaft ends, said shaft being provided in an interrelated manner with a ring member which abuts on one side said flange and is rotatable about said shaft, a tapered ring slidably attached to said shaft and a resilient member, said members being arranged in an interrelated manner so that said resilient member is compressed by said tapered ring as said shaft is moved in the direction to increase the tension of the band saw, and bell cranks pivotally connected to one section of said ring member, one end of said bell cranks being arranged to contact one side of said tapered ring, and another end of said bell cranks being arranged to contact a tapered face provided at said one side of the tapered ring.

* * * * *